(12) United States Patent
Hiroi et al.

(10) Patent No.: US 12,344,731 B2
(45) Date of Patent: Jul. 1, 2025

(54) PROPYLENE POLYMER COMPOSITION AND SHAPED ARTICLE

(71) Applicants: PRIME POLYMER CO., LTD., Tokyo (JP); MITSUI CHEMICALS, INC., Tokyo (JP)

(72) Inventors: Ryoko Hiroi, Chiba (JP); Keita Itakura, Ichihara (JP); Shino Naito, Ichihara (JP); Takanori Furuta, Takaishi (JP); Kou Tsurugi, Sodegaura (JP)

(73) Assignees: PRIME POLYMER CO., LTD, Tokyo (JP); MITSUI CHEMICALS, INC., Tokyo (JP)

(*) Notice: Subject to any disclaimer, the term of this patent is extended or adjusted under 35 U.S.C. 154(b) by 689 days.

(21) Appl. No.: 17/632,467

(22) PCT Filed: Aug. 7, 2020

(86) PCT No.: PCT/JP2020/030322
§ 371 (c)(1),
(2) Date: Feb. 2, 2022

(87) PCT Pub. No.: WO2021/025141
PCT Pub. Date: Feb. 11, 2021

(65) Prior Publication Data
US 2022/0380585 A1  Dec. 1, 2022

(30) Foreign Application Priority Data

Aug. 8, 2019 (JP) ................. 2019-146843

(51) Int. Cl.
C08L 23/12 (2006.01)
B29C 45/00 (2006.01)
B29K 23/00 (2006.01)
C08L 23/08 (2025.01)
C08L 23/14 (2006.01)

(52) U.S. Cl.
CPC .......... *C08L 23/12* (2013.01); *B29C 45/0001* (2013.01); *C08L 23/08* (2013.01); *C08L 23/14* (2013.01); *B29K 2023/12* (2013.01); *B29K 2023/14* (2013.01); *C08L 2205/025* (2013.01); *C08L 2205/035* (2013.01)

(58) Field of Classification Search
CPC .......... C08L 23/10; C08L 23/12; C08L 23/14; C08L 23/142; C08L 2205/025; C08L 2205/035

See application file for complete search history.

(56) References Cited

U.S. PATENT DOCUMENTS

| | | | |
|---|---|---|---|
| 7,282,537 B2 | 10/2007 | Kanzaki et al. | |
| 9,315,657 B2 | 4/2016 | Nakajima | |
| 2003/0153689 A1 | 8/2003 | Mehta et al. | |
| 2005/0154131 A1 | 7/2005 | Kanzaki et al. | |
| 2015/0018474 A1 | 1/2015 | Nakajima | |

FOREIGN PATENT DOCUMENTS

| | | |
|---|---|---|
| EP | 0 646 624 A1 | 4/1995 |
| JP | 2005-146160 A | 6/2005 |
| JP | 2007-224179 A | 9/2007 |
| JP | 2008-163320 A | 7/2008 |
| JP | 2009-299017 A | 12/2009 |
| JP | 2011-057852 A | 3/2011 |
| JP | 2014-214202 A | 11/2014 |
| JP | 2015-034292 A | 2/2015 |
| JP | 2016-084387 A | 5/2016 |

*Primary Examiner* — Marc S Zimmer
*Assistant Examiner* — Jeffrey S Lenihan
(74) *Attorney, Agent, or Firm* — Foley & Lardner LLP

(57) ABSTRACT

A propylene polymer composition includes a propylene homopolymer (A) having an intrinsic viscosity [η] measured in a tetralin solvent at 135° C. in the range of 7 to 12 dl/g, a propylene polymer (B) having an intrinsic viscosity [η] in the range of not less than 0.21 dl/g and less than 0.54 dl/g, and having a proportion of a component eluted at a temperature of not more than −20° C. in TREF in the range of not more than 3.5 mass %, and a propylene polymer (C) having an intrinsic viscosity [η] in the range of not less than 0.54 dl/g and less than 2.6 dl/g, wherein the content of (A) is 0.5 to 47.5 mass %, the content of (B) is 5 to 95 mass % and the content of (C) is 2.5 to 85.5 mass %, based on the total of (A), (B) and (C).

7 Claims, No Drawings

PROPYLENE POLYMER COMPOSITION AND SHAPED ARTICLE

CROSS-REFERENCE TO RELATED APPLICATIONS

The present application claims priority under 37 U.S.C. § 371 to International Patent Application No. PCT/JP2020/030322, filed Aug. 7, 2020, which claims priority to and the benefit of Japanese Patent Application No. 2019-146843, filed on Aug. 8, 2019. The contents of these applications are hereby incorporated by reference in their entireties.

TECHNICAL FIELD

The present invention relates to a propylene polymer composition and a shaped article.

BACKGROUND ART

Shaped articles obtained by injection molding propylene polymer compositions have excellent mechanical properties and shaping properties and are relatively advantageous in cost performance compared to other materials, thus finding increasing use in numerous fields such as automobile parts and home appliance parts (see, for example, Patent Literatures 1 to 3).

CITATION LIST

Patent Literature

Patent Literature 1: JP-A-2014-214202
Patent Literature 2: JP-A-2016-084387
Patent Literature 3: JP-A-2007-224179

SUMMARY OF INVENTION

Technical Problem

In recent years, environmentally friendly fuel-efficient vehicles are increasingly developed in the automobile industry. In the field of automobile materials too, there are demands for the shift from existing materials to resins and further thinning of materials for the purpose of weight reduction. Under such circumstances, great expectations exist for improvements of propylene materials that have many achievements as automobile materials such as bumper materials. Shaped articles having still enhanced rigidity are desired mainly for use as alternatives to metal materials.

In light of the art discussed above, objects of the present invention are to provide a propylene polymer composition that is capable of giving shaped articles with excellent rigidity, and to provide a shaped article comprising the propylene polymer composition.

Solution to Problem

The present inventors carried out extensive studies directed to realizing the above objects, and have consequently found that the objects described above is achieved with a propylene polymer composition described below. The present invention has been completed based on the finding.

For example, the present invention pertains to the following [1] to [7].

[1] A Propylene Polymer Composition Comprising:
a propylene homopolymer (A) having an intrinsic viscosity [η] measured in a tetralin solvent at 135° C. in the range of 7 to 12 dl/g;
a propylene polymer (B) having an intrinsic viscosity [η] measured in a tetralin solvent at 135° C. in the range of not less than 0.21 dl/g and less than 0.54 dl/g, and having a proportion of a component eluted at a temperature of not more than −20° C. in temperature rising elution fractionation (TREF) in the range of not more than 3.5 mass %; and
a propylene polymer (C) having an intrinsic viscosity [η] measured in a tetralin solvent at 135° C. in the range of not less than 0.54 dl/g and less than 2.6 dl/g; wherein
the content of the propylene homopolymer (A) is 0.5 to 47.5 mass %, the content of the propylene polymer (B) is 5 to 95 mass % and the content of the propylene polymer (C) is 2.5 to 85.5 mass %, based on the total of the propylene homopolymer (A), the propylene polymer (B) and the propylene polymer (C).

[2] The propylene polymer composition described in [1], further comprising an ethylene random copolymer (D) and/or an inorganic filler (E), wherein the content of the ethylene random copolymer (D) is 0 to 40 mass % and the content of the inorganic filler (E) is 0 to 50 mass %, based on the total of the propylene homopolymer (A), the propylene polymer (B), the propylene polymer (C), the ethylene random copolymer (D) and the inorganic filler (E), provided that the content of at least one of the ethylene random copolymer (D) and the inorganic filler (E) is more than 0 mass %.

[3] The propylene polymer composition described in [1] or [2], wherein the propylene polymer (B) has a meso pentad fraction (mmmm) determined by $^{13}$C-NMR of 90.0 to 100%.

[4] The propylene polymer composition described in any of [1] to [3], wherein the propylene polymer (B) has a melting point (Tm) measured with a differential scanning calorimeter (DSC) of not less than 140° C.

[5] The propylene polymer composition described in any of [1] to [4], wherein the propylene polymer (B) has a total proportion of irregular bonds stemming from 2,1-insertion and 1,3-insertion in all propylene units determined by $^{13}$C-NMR in the range of not more than 0.3 mol %.

[6] The propylene polymer composition described in any of [1] to [5], wherein the content of propylene-derived structural units in the propylene polymer (B) is not less than 98 mol %.

[7] A shaped article formed using at least the propylene polymer composition described in any of [1] to [6].

Advantageous Effects of Invention

The propylene polymer composition according to the present invention can give shaped articles with excellent rigidity. The present invention also provides a shaped article including the propylene polymer composition.

DESCRIPTION OF EMBODIMENTS

Hereinbelow, embodiments of the present invention will be described.

In the present specification, a "propylene polymer" may be a homopolymer of propylene or may be a copolymer of propylene and an additional monomer. The term "polymerization" includes concepts of both homopolymerization and copolymerization.

Details of the conditions under which properties discussed below are measured will be described in the section of Examples. The intrinsic viscosity $[\eta]$ measured in a tetralin solvent at 135° C. is also simply written as the "intrinsic viscosity $[\eta]$". The components described hereinbelow may be used singly, or two or more kinds may be used in combination unless otherwise mentioned.

[Propylene Polymer Compositions]

A propylene polymer composition of the present invention (hereinafter, also written as the "composition of the present invention".) includes a propylene homopolymer (A), a propylene polymer (B) and a propylene polymer (C), each described below.

In the present invention, by using a composition including the propylene homopolymer (A), which is a high-molecular component, and the propylene polymer (B), which has high fluidity, shaped articles may attain an enhancement in rigidity in comparison with the case of single use of each of the polymers.

<Propylene Homopolymers (A)>

The propylene homopolymer (A) preferably has an intrinsic viscosity $[\eta_h]$ measured in a tetralin solvent at 135° C. in the range of 7 to 12 dl/g, preferably in the range of 10 to 12 dl/g, and more preferably in the range of 10.5 to 11.5 dl/g. When the intrinsic viscosity $[\eta_h]$ of the propylene homopolymer (A) is in the above range, shaped articles with excellent rigidity and excellent appearance tend to be obtained.

The propylene homopolymer (A) preferably has a melting point (Tm) measured with a differential scanning calorimeter (DSC) in the range of not less than 150° C., more preferably in the range of 155 to 170° C., and still more preferably in the range of 157 to 170° C. The lower limit of Tm described above is advantageous from the point of view of heat resistance. Here, the endothermic peak at the third step in the following measurement conditions is defined as the melting point (Tm).

(Measurement Conditions)

First step: The temperature is raised to 230° C. at 10° C./min and held for 10 minutes.

Second step: The temperature is lowered to 30° C. at 10° C./min.

Third step: The temperature is raised to 230° C. at 10° C./min.

The propylene homopolymers (A) may be used singly, or two or more may be used in combination.

<<Production Conditions>>

The homopolymerization of propylene in production of the propylene homopolymer (A) may be carried out by a known method such as slurry polymerization or bulk polymerization. A catalyst for polypropylene production, described below, is preferably used.

The propylene homopolymer (A) is preferably produced by bulk polymerization of a raw monomer in the absence of hydrogen in conditions of a polymerization temperature of preferably 20 to 80° C., and more preferably 40 to 70° C., and a polymerization pressure of generally atmospheric pressure to 9.8 MPa, and preferably 0.2 to 4.9 MPa.

The propylene homopolymer (A) satisfying the above properties may be produced by the above method, or, for example, the propylene homopolymer (A) satisfying the above properties and the propylene polymer (C) satisfying properties described below may be produced in one polymerization system or two or more polymerization systems.

The propylene polymer (C) is preferably produced by polymerization of a raw monomer in the presence of hydrogen as a molecular weight modifier in conditions of a polymerization temperature of preferably 20 to 80° C., and more preferably 40 to 70° C., and a polymerization pressure of generally atmospheric pressure to 9.8 MPa, and preferably 0.2 to 4.9 MPa.

A propylene polymer mixture including the propylene homopolymer (A), which has a relatively high-molecular weight, and the propylene polymer (C), which has a relatively low-molecular weight, may be obtained by multistage polymerization of two or more stages in the above method.

For example, the propylene polymer mixture may be produced by a multistage polymerization process of two or more stages, the process including homopolymerizing propylene or copolymerizing propylene and an additional monomer in the presence of a catalyst for polypropylene production described below.

Specifically, the propylene homopolymer (A), which has a relatively high-molecular weight, is produced by polymerizing propylene in the substantial absence of hydrogen in the polymerization in the first stage, and the propylene polymer (C), which has a relatively low-molecular weight, is produced in the polymerization in the second or later stage. The intrinsic viscosity $[\eta_h]$ of the propylene polymer produced in the second or later stage may be adjusted by any method without limitation and is preferably adjusted by a method using hydrogen as a molecular weight modifier.

The propylene homopolymer (A) and the propylene polymer (C) are produced in the following order (polymerization order). Preferably, the propylene homopolymer (A) having a relatively high-molecular weight is produced in the substantial absence of hydrogen in the first stage, and thereafter the propylene polymer (C) having a relatively low-molecular weight is produced, for example, in the presence of hydrogen in the second or later stage. The production order may also be reversed. However, when the propylene polymer (C) having a relatively low-molecular weight is produced in the first stage and thereafter the propylene homopolymer (A) having a relatively high-molecular weight is produced in the second or later stage, a molecular weight modifier such as hydrogen, contained in a reaction product in the first stage, is needed to be removed as much as possible before the start of the polymerization in the second or later stage, and thus a polymerization apparatus is complicated and the intrinsic viscosity $[\eta]$ is hardly higher in the second or later stage.

The polymerization in each stage in the multistage polymerization may be performed continuously or batchwise, and is preferably performed batchwise. It is because that when the propylene polymer mixture is produced by a continuous multistage polymerization process, the variation in composition between polymerized particles may occur depending on the retention time and fish eyes may be increased. A propylene polymer mixture with few fish eyes may be obtained by performing the polymerization batchwise.

<<Catalysts for Polypropylene Production>>

A catalyst for polypropylene production, usable for production of the propylene homopolymer (A) (hereinafter, also simply written as the "catalyst") may be formed from, for example, a solid catalyst component including magnesium, titanium and halogen as essential components, an organometallic compound catalyst component such as an organoaluminum compound, and an electron-donating compound catalyst component such as an organosilicon compound, and the following catalyst component may be representatively used.

(Solid Catalyst Components)

A carrier for constituting the solid catalyst component is preferably a carrier obtained from metallic magnesium, alcohol, and halogen and/or a halogen-containing compound.

The metallic magnesium used may be, for example, magnesium in the form of granules, ribbons or powders. The metallic magnesium is preferably one not provided with any covering such as magnesium oxide on the surface thereof.

The alcohol used is preferably C1-C6 lower alcohol, and in particular, ethanol is used to provide a carrier for remarkably enhancing development of catalyst performance. The amount of the alcohol used, to 1 mol of the metallic magnesium, is preferably 2 to 100 mol and more preferably 5 to 50 mol. The alcohols may be used singly, or two or more may be used in combination.

The halogen is preferably chlorine, bromine or iodine, and preferably iodine. The halogen-containing compound is preferably $MgCl_2$ or $MgI_2$. The amount of the halogen or the halogen-containing compound used, based on 1 gram atom of the metallic magnesium, is usually not less than 0.0001 gram atoms, preferably not less than 0.0005 gram atoms, and still more preferably not less than 0.001 gram atoms, in terms of halogen atom or halogen atom in the halogen-containing compound. The halogens and halogen-containing compounds each may be used singly, or two or more may be used in combination.

The carrier is obtained by reacting the metallic magnesium, the alcohol, and the halogen and/or the halogen-containing compound, for example, by reacting the metallic magnesium, the alcohol, and the halogen and/or the halogen-containing compound until the occurrence of hydrogen gas under reflux (for example: about 79° C.) is not observed (usually 20 to 30 hours). The reaction is preferably performed in an atmosphere of inert gas such as nitrogen gas or argon gas.

When the resultant carrier is used for synthesis of the solid catalyst component, the carrier dried may be used or the carrier separated by filtration and then washed with an inert solvent such as heptane may be used.

The resultant carrier is nearly in the form of particles, and also has a sharp particle size distribution. Furthermore, the variation in degree of particle shape is very small with respect to each particle. In this case, it is preferable that the degree of sphericity (S) represented by the following equation (I) is less than 1.60, in particular, less than 1.40, and the particle size distribution index (P) represented by the following equation (II) is less than 5.0, in particular, less than 4.0.

$$S=(E1/E2)^2 \qquad (I)$$

In the equation (I), E1 represents the projected contour length of a particle, and E2 represents the perimeter of a circle having the same area as the projected area of the particle.

$$P=D90/D10 \qquad (II)$$

In the equation (II), D90 means a particle size at which the accumulated mass fraction corresponds to 90%. Specifically, the sum of the masses of a group of particles smaller in particle size than that represented by D90 is 90% to the total sum of the masses of all particles. D10 means the particle size at which the accumulated mass fraction corresponds to 10%.

The solid catalyst component is usually obtained by bringing at least a titanium compound into contact with the carrier. Such a contact with the titanium compound may be performed in a plurality of divided portions. Examples of the titanium compounds include titanium compounds represented by general formula (III).

$$TiX_n^1(OR^1)_{4-n} \qquad (III)$$

In the formula (III), $X^1$ is a halogen atom, particularly preferably a chlorine atom, $R^1$ is a C1-C10 hydrocarbon group, preferably a linear or branched alkyl group, $R^1$, when a plurality thereof are present, may be the same as or different from each other, and n is an integer of 0 to 4.

Specific examples of the titanium compounds include Ti (O-i-$C_3H_7$)$_4$, Ti (O—$C_4H_9$)$_4$, TiCl (O—$C_2H_5$)$_3$, TiCl (O-i-$C_3H_7$)$_3$, TiCl (O—$C_4H_9$)$_3$, $TiCl_2$ (O—$C_4H_9$)$_2$, $TiCl_2$ (O-i-$C_3H_7$)$_2$ and $TiCl_4$, and $TiCl_4$ is preferable.

The titanium compounds may be used singly, or two or more may be used in combination.

The solid catalyst component is usually obtained by further bringing an electron-donating compound into contact with the carrier. Examples of the electron-donating compounds include di-n-butyl phthalate. The electron-donating compounds may be used singly, or two or more may be used in combination.

When the titanium compound and the electron-donating compound are brought into contact with the carrier, a halogen-containing silicon compound such as silicon tetrachloride may be brought into contact therewith. The halogen-containing silicon compounds may be used singly, or two or more may be used in combination.

The solid catalyst component may be prepared by a known method. The solid catalyst component is obtained by, for example, a method in which an inert hydrocarbon such as pentane, hexane, heptane or octane is used as a solvent, the carrier, the electron-donating compound and the halogen-containing silicon compound are added into the solvent, and the titanium compound is added while performing stirring. The electron-donating compound is usually added at 0.01 to 10 mol, preferably 0.05 to 5 mol, to 1 mol of the carrier in terms of magnesium atoms, and the titanium compound is added at 1 to 50 mol, preferably 2 to 20 mol, to 1 mol of the carrier in terms of magnesium atoms, and such a contacting reaction may be performed in conditions of 0 to 200° C. and 5 minutes to 10 hours, preferably in conditions of 30 to 150° C. and 30 minutes to 5 hours. After the completion of the reaction, the solid catalyst component produced is preferably washed with an inert hydrocarbon such as n-hexane or n-heptane.

The solid catalyst component may also be a component obtained by bringing a liquid magnesium compound into contact with a liquid titanium compound in the presence of the electron-donating compound. Such a contact with the liquid titanium compound may be performed in a plurality of divided portions.

The liquid magnesium compound is obtained by, for example, bringing a known magnesium compound into contact with alcohol preferably in the presence of a liquid hydrocarbon medium to provide a liquid. Examples of the magnesium compounds include magnesium halides such as magnesium chloride and magnesium bromide. Examples of the alcohols include aliphatic alcohols such as methanol, ethanol, n-propanol, isopropanol, n-butanol, isobutanol and 2-ethylhexyl alcohol. Examples of the liquid hydrocarbon medium include hydrocarbon compounds such as heptane, octane and decane. The amount of the alcohol used in preparation of the liquid magnesium compound, to 1 mol of the magnesium compound, is usually 1.0 to 25 mol, preferably 1.5 to 10 mol. The liquid magnesium compounds may be used singly, or two or more may be used in combination.

Examples of the liquid titanium compounds include the titanium compounds represented by general formula (III). The amount of the liquid titanium compound used, to 1 mol of the magnesium atoms (Mg) contained in the liquid magnesium compound, is usually 0.1 to 1000 mol, preferably 1 to 200 mol. The liquid titanium compounds may be used singly, or two or more may be used in combination.

Examples of the electron-donating compounds include dicarboxylic acid ester compounds such as phthalic acid esters, acid anhydrides such as phthalic anhydride, organosilicon compounds such as dicyclopentyldimethoxysilane, dicyclohexyldimethoxysilane and cyclohexylmethyldimethoxysilane, polyethers, acid halides, acid amides, nitriles, and organic acid esters. The amount of the electron-donating compound used, to 1 mol of the magnesium atoms (Mg) contained in the liquid magnesium compound, is usually 0.01 to 5 mol, preferably 0.1 to 1 mol. The electron-donating compounds may be used singly, or two or more may be used in combination.

The temperature in contacting is usually −70 to 200° C., preferably 10 to 150° C.

(Organometallic Compound Catalyst Components)

The organometallic compound catalyst component in the catalyst component is preferably an organoaluminum compound. Examples of the organoaluminum compounds include compounds represented by general formula (IV).

$$AlR_n^2 X_{3-n}^2 \qquad (IV)$$

In the formula (IV), $R^2$ is a C1-C10 alkyl group, a cycloalkyl group or an aryl group, $X^2$ is a halogen atom or an alkoxy group, preferably a chlorine atom or a bromine atom, and n is an integer of 1 to 3.

Specific examples of the organoaluminum compounds include trialkylaluminum compounds such as trimethylaluminum, triethylaluminum and triisobutylaluminum, and diethylaluminum monochloride, diisobutylaluminum monochloride, diethylaluminum monoethoxide and ethylaluminum sesquichloride.

The organoaluminum compounds may be used singly, or two or more may be used in combination.

The amount of the organometallic compound catalyst component used, to 1 mol of the titanium atoms in the solid catalyst component, is usually 0.01 to 20 mol, preferably 0.05 to 10 mol.

(Electron-Donating Compound Catalyst Components)

The electron-donating compound component to be subjected to a polymerization system, in the catalyst component, is preferably an organosilicon compound. Examples of the organosilicon compounds include dicyclopentyldimethoxysilane, cyclohexylmethyldimethoxysilane, diethylaminotriethoxysilane, diisopropyldimethoxysilane and cyclohexylisobutyldimethoxysilane.

The organosilicon compounds may be used singly, or two or more may be used in combination.

The amount of the electron-donating compound component used, to 1 mol of the titanium atoms in the solid catalyst component, is usually 0.01 to 20 mol, preferably 0.1 to 5 mol.

(Pre-treatment)

The solid catalyst component is preferably subjected to pre-treatment, for example, prepolymerization, and then used for polymerization. For example, an inert hydrocarbon such as pentane, hexane, heptane or octane is used as a solvent, the solid catalyst component, the organometallic compound catalyst component and, as required, the electron-donating compound component are added to the solvent, propylene is supplied while performing stirring, and a reaction is allowed to occur. Preferably, the propylene is supplied at a higher partial pressure of the propylene than atmospheric pressure and the pre-treatment is performed at 0 to 100° C. for 0.1 to 24 hours. After the completion of the reaction, the pre-treated product is preferably washed with an inert hydrocarbon such as n-hexane or n-heptane.

<Propylene Polymers (B)>

The propylene polymer (B) has an intrinsic viscosity $[\eta]$ measured in a tetralin solvent at 135° C. in the range of not less than 0.21 dl/g and less than 0.54 dl/g, preferably not less than 0.23 dl/g and less than 0.54 dl/g, more preferably not less than 0.25 dl/g and less than 0.54 dl/g, still more preferably not less than 0.25 dl/g and less than 0.50 dl/g, and most preferably not less than 0.25 dl/g and less than 0.47 dl/g. This range of the intrinsic viscosity $[\eta]$ of the propylene polymer (B) is advantageous in that high fluidity and mechanical properties (strength) are maintained.

The propylene polymer (B) has a proportion of components eluted at temperatures of not more than −20° C. in temperature rising elution fractionation (TREF) in the range of not more than 3.5 mass %, preferably not more than 3.2 mass %, and more preferably not more than 3.0 mass %. Here, the amount of all the components eluted at measurement temperatures of −20 to 130° C. in TREF is taken as 100 mass %. When the proportion of the above eluted components is in the above range, shaped articles that are obtained tend to be enhanced in rigidity and heat resistance.

The propylene polymer (B) preferably has a number average molecular weight (Mn) measured by gel permeation chromatography (GPC) in the range of 5,000 to 29,000, more preferably 6,000 to 29,000, and still more preferably 7,000 to 29,000. This range of Mn is advantageous in that the propylene polymer composition attains high rigidity and maintains mechanical strength.

The propylene polymer (B) preferably has a ratio (Mw/Mn) of the weight average molecular weight (Mw) to the number average molecular weight (Mn) measured by GPC in the range of 1.2 to 3.5, more preferably 1.2 to 3.2, and still more preferably 1.2 to 3.0. This range of Mw/Mn is advantageous in that the amount of ultralow-molecular components (probably acting as components that bleed out in shaped articles) is small.

The propylene polymer (B) preferably has a melting point (Tm) measured with a differential scanning calorimeter (DSC; details of measurement conditions are as described above) of not less than 140° C., more preferably 143 to 170° C., still more preferably 150 to 160° C. The lower limit of Tm described above is advantageous from the point of view of heat resistance.

The propylene polymer (B) preferably has a meso pentad fraction (mmmm) determined by $^{13}$C-NMR of 90.0 to 100%, more preferably 96.0 to 100%, still more preferably 97.0 to 100%. In an embodiment, the upper limit of mmmm described above may be 99.9%, 99.5% or 99.0%. The lower limit of mmmm described above is advantageous from the point of view of heat resistance.

The meso pentad fraction indicates the proportion of quintuplet isotactic structures present in the molecular chains, and is the fraction of the propylene units each at the center of a sequence composed of five consecutive meso-propylene units.

The propylene polymer (B) preferably has a total proportion of irregular bonds stemming from 2,1-insertion and 1,3-insertion of propylene monomers in all the propylene units determined by $^{13}$C-NMR in the range of not more than 0.3 mol %, more preferably not more than 0.1 mol %. This range of the total proportion of irregular bonds is advantageous in that the amount of low-crystalline and ultralow-molecular components (probably inhibiting the rigidity improving effects) is small.

Examples of the propylene polymers (B) include homopolymers of propylene, and copolymers of propylene and a C2-C20 α-olefin (except propylene). Examples of the C2-C20 α-olefins include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. The α-olefins may be used singly, or two or more may be used in combination.

Among the polymers described above, propylene homopolymer, propylene/ethylene copolymer, propylene/1-butene copolymer, propylene/1-hexene copolymer, propylene/4-methyl-1-pentene copolymer, propylene/1-octene copolymer, propylene/ethylene/1-butene copolymer, propylene/ethylene/1-hexene copolymer, propylene/ethylene/4-methyl-1-pentene copolymer, and propylene/ethylene/1-octene copolymer are preferable, and propylene homopolymer is particularly preferable.

In the copolymer of propylene and the C2-C20 α-olefin, the content of propylene-derived structural units is usually not less than 98 mol % and less than 100 mol %, and preferably not less than 99 mol % and less than 100 mol %, and the content of C2-C20 α-olefin (except propylene)-derived structural units is usually more than 0 mol % and not more than 2 mol %, and preferably more than 0 mol % and not more than 1 mol %, to the total of the number of propylene-derived structural units and the number of C2-C20 α-olefin-derived structural units. These contents may be measured by $^{13}$C-NMR.

The propylene polymers (B) may be used singly, or two or more may be used in combination.

<<Methods for Producing Propylene Polymer (B)>>

The propylene polymer (B) is preferably a polymer produced by homopolymerizing propylene or copolymerizing propylene with an additional monomer in the presence of a metallocene catalyst.

(Metallocene Compounds)

The metallocene catalyst is usually a polymerization catalyst that includes a metallocene compound having a ligand such as a cyclopentadienyl skeleton in the molecule. Examples of the metallocene compounds include metallocene compounds (I) represented by the formula (I) and bridged metallocene compounds (II) represented by the formula (II), with the bridged metallocene compounds (II) being preferable.

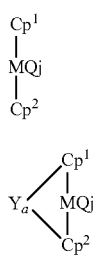

(I)

(II)

In the formulas (I) and (II), M is a Group IV transition metal in the periodic table, preferably titanium, zirconium or hafnium, and more preferably zirconium; Q is a halogen atom, a hydrocarbon group, a C10 or lower neutral, conjugated or nonconjugated diene, an anionic ligand or a neutral ligand capable of coordination with a lone electron pair; j is an integer of 1 to 4; and $Cp^1$ and $Cp^2$, which may be the same as or different from each other, are each a cyclopentadienyl group or a substituted cyclopentadienyl group and form a sandwich structure together with M in between.

Examples of the substituted cyclopentadienyl groups include indenyl group, fluorenyl group, azulenyl group, and groups resulting from the substitution of the above groups and cyclopentadienyl group with one or more substituents such as halogen atoms, hydrocarbon groups, silicon-containing groups and halogenated hydrocarbon groups. When the substituted cyclopentadienyl group is an indenyl group, a fluorenyl group or an azulenyl group, part of the double bonds in the unsaturated ring condensed to the cyclopentadienyl group may be hydrogenated.

In the formula (II), Ya is a C1-C20 divalent hydrocarbon group, a C1-C20 divalent halogenated hydrocarbon group, a divalent silicon-containing group, —Ge—, a divalent germanium-containing group, —Sn—, a divalent tin-containing group, —O—, —CO—, —S—, —SO—, —SO$_2$—, —NR$^a$—, —P(R$^a$)—, —P(O) (R$^a$)—, —BR$^a$— or —AlR$^a$—. R$^a$ is a hydrogen atom, a C1-C20 hydrocarbon group, a halogen atom, a C1-C20 halogenated hydrocarbon group, or an amino group to which one or two C1-C20 hydrocarbon groups are bonded. Part of Ya may bond to $Cp^1$ and/or $Cp^2$ to form a ring.

The metallocene compound is preferably a bridged metallocene compound (III) represented by the formula (III).

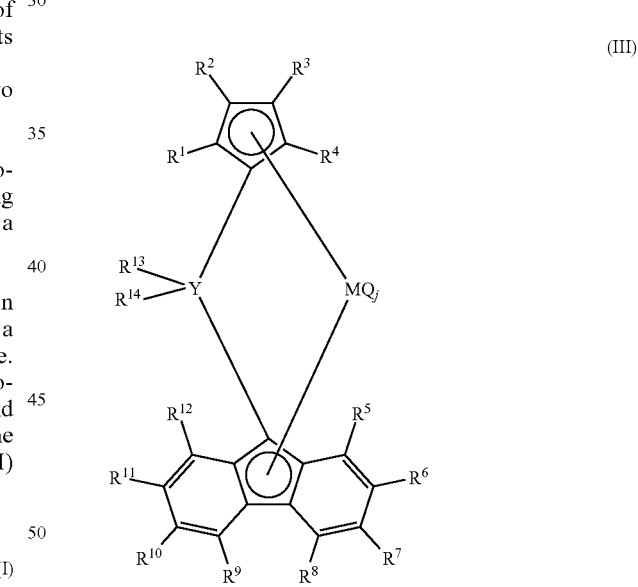

(III)

In the formula (III), $R^1$ to $R^{14}$ are each independently a hydrogen atom, a halogen atom, a hydrocarbon group, a silicon-containing group or a halogenated hydrocarbon group, and preferably a hydrogen atom or a hydrocarbon group. Y is a Group XIV element, preferably carbon, silicon or germanium, and more preferably carbon. M is a Group IV transition metal in the periodic table, preferably titanium, zirconium or hafnium, and more preferably zirconium. Q is a halogen atom, a hydrocarbon group, a C10 or lower neutral, conjugated or nonconjugated diene, an anionic ligand or a neutral ligand capable of coordination with a lone electron pair. The letter j is an integer of 1 to 4, and preferably 2. When j is 2 or greater, the plurality of Q may be the same as or different from one another.

Specific examples of the atoms and groups represented by $R^1$ to $R^{14}$ are as follows.

Examples of the halogen atoms include fluorine, chlorine, bromine and iodine.

Examples of the hydrocarbon groups include linear or branched hydrocarbon groups such as alkyl groups and alkenyl groups; cyclic saturated hydrocarbon groups such as cycloalkyl groups and polycyclic saturated hydrocarbon groups; cyclic unsaturated hydrocarbon groups such as aryl groups, cycloalkenyl groups and polycyclic unsaturated hydrocarbon groups; and saturated hydrocarbon groups substituted with a cyclic unsaturated hydrocarbon group such as aryl-substituted alkyl groups. The number of carbon atoms in the hydrocarbon groups is usually 1 to 20, preferably 1 to 15, and more preferably 1 to 10.

Examples of the silicon-containing groups include groups represented by the formula —$SiR_3$ (wherein the plurality of R are each independently an alkyl group having 1 to 15 carbon atoms, preferably 1 to 3 carbon atoms, or a phenyl group).

Examples of the halogenated hydrocarbon groups include groups resulting from the substitution of the hydrocarbon groups described above with a halogen atom in place of one, or two or more hydrogen atoms, such as alkyl halide groups.

Adjacent substituents among $R^5$ to $R^{12}$ may bond to each other to form a ring. Specifically, for example, there may be formed a benzofluorenyl group, a dibenzofluorenyl group, an octahydrodibenzofluorenyl group, an octamethyloctahydrodibenzofluorenyl group or an octamethyltetrahydrodicyclopentafluorenyl group. It is particularly preferable that $R^6$, $R^7$, $R^{10}$ and $R^{11}$ on the fluorene ring be not hydrogen atoms at the same time.

$R^{13}$ and $R^{14}$ may bond to each other to form a ring, or may bond to an adjacent group of $R^5$ to $R^{12}$ or to an adjacent group of $R^1$ to $R^4$ to form a ring.

Regarding Q, examples of the halogen atoms include fluorine, chlorine, bromine and iodine; and examples of the hydrocarbon groups include alkyl groups having 1 to 10 carbon atoms, preferably 1 to 5 carbon atoms, and cycloalkyl groups having 3 to 10 carbon atoms, preferably 5 to 8 carbon atoms.

Examples of the C10 or lower neutral, conjugated or nonconjugated dienes include s-cis- or s-trans-$\eta^4$-1,3-butadiene, s-cis- or s-trans-$\eta^4$-1,4-diphenyl-1,3-butadiene, s-cis- or s-trans-$\theta^4$-3-methyl-1,3-pentadiene, s-cis- or s-trans-$\theta^4$-1,4-dibenzyl-1,3-butadiene, s-cis- or s-trans-$\eta^4$-2,4-hexadiene, s-cis- or s-trans-$\theta^4$-1,3-pentadiene, s-cis- or s-trans-$\eta^4$-1,4-ditolyl-1,3-butadiene, and s-cis- or s-trans-$\theta^4$-1,4-bis(trimethylsilyl)-1,3-butadiene.

Examples of the anionic ligands include alkoxy groups such as methoxy and t-butoxy; aryloxy groups such as phenoxy; carboxylate groups such as acetate and benzoate; and sulfonate groups such as mesylate and tosylate.

Examples of the neutral ligands capable of coordination with a lone electron pair include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane.

Q is preferably a halogen atom or a C1-C5 alkyl group.

Specific examples of the metallocene compounds include those compounds described in literature such as WO 2001/27124, WO 2005/121192, WO 2014/050817, WO 2014/123212 and WO 2017/150265.

The metallocene compound is more preferably a bridged metallocene compound (IV) of the formula (IV) described in literature such as WO 2014/050817.

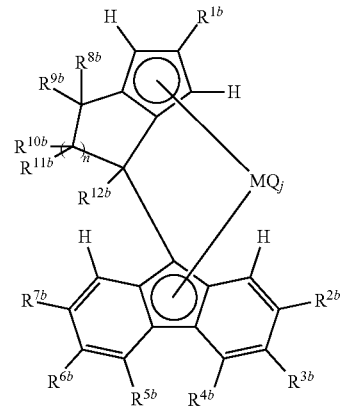

(IV)

In the formula (IV), $R^{1b}$ is a hydrocarbon group, a silicon-containing group or a halogenated hydrocarbon group. $R^{2b}$ to $R^{12b}$ are selected from hydrogen atom, halogen atoms, hydrocarbon groups, silicon-containing groups and halogenated hydrocarbon groups and may be the same as or different from one another, and these substituents may bond to one another to form a ring. The letter n is an integer of 1 to 3. M is a Group IV transition metal in the periodic table. Q is a halogen atom, a hydrocarbon group, a C10 or lower neutral, conjugated or nonconjugated diene, an anionic ligand or a neutral ligand capable of coordination with a lone electron pair. The letter j is an integer of 1 to 4, and preferably 2. When j is 2 or greater, the plurality of Q may be the same as or different from one another.

Referring to the formula (IV), specific examples of the halogen atoms, the hydrocarbon groups, the silicon-containing groups, the halogenated hydrocarbon groups, the Group IV transition metals in the periodic table, and the halogen atoms, hydrocarbon groups, C10 or lower neutral, conjugated or nonconjugated dienes, anionic ligands and neutral ligands capable of coordination with a lone electron pair that are each represented by Q include those described with respect to the formula (III).

Among the substituents $R^{2b}$ to $R^{12b}$, two substituents may bond to each other to form a ring, and two or more such rings may be formed in the molecule. Examples of the rings (spiro rings, additional rings) formed by bonding of two substituents include alicyclic rings and aromatic rings. Specific examples include cyclohexane ring, benzene ring, hydrogenated benzene ring and cyclopentene ring, with cyclohexane ring, benzene ring and hydrogenated benzene ring being preferable. Further, such a ring structure may have an additional substituent such as an alkyl group on the ring.

From the point of view of stereoregularity, $R^{1b}$ is preferably a hydrocarbon group, more preferably a C1-C20 hydrocarbon group, still more preferably a linear hydrocarbon group, a branched hydrocarbon group or a cyclic saturated hydrocarbon group, and particularly preferably a substituent in which the carbon having a free valence (the carbon bonded to the cyclopentadienyl ring) is a tertiary carbon.

Specific examples of $R^{1b}$ include methyl group, ethyl group, isopropyl group, tert-butyl group, tert-pentyl group, tert-amyl group, 1-methylcyclohexyl group and 1-adamantyl group. More preferable are substituents in which the carbon having a free valence is a tertiary carbon, such as tert-butyl group, tert-pentyl group, 1-methylcyclohexyl group and 1-adamantyl group. Tert-butyl group and 1-adamantyl group are particularly preferable.

$R^{4b}$ and $R^{5b}$ are preferably each a hydrogen atom.

$R^{2b}$, $R^{3b}$, $R^{6b}$ and $R^{7b}$ are preferably each a hydrogen atom or a hydrocarbon group, more preferably a hydrocarbon group, and still more preferably a C1-C20 hydrocarbon group. $R^{2b}$ and $R^{3b}$ may bond to each other to form a ring, and $R_{6b}$ and $R_{7b}$ may bond to each other to form a ring, simultaneously. Examples of such substituted fluorenyl groups include benzofluorenyl group, dibenzofluorenyl group, octahydrodibenzofluorenyl group, 1,1,4,4,7,7,10,10-octamethyl-2,3,4,7,8,9,10,12-octahydro-1H-dibenzo[b,h]fluorenyl group, 1,1,3,3,6,6,8,8-octamethyl-2,3,6,7,8,10-hexahydro-1H-dicyclopenta[b,h]fluorenyl group and 1',1',3',6',8',8'-hexamethyl-1'H,8'H-dicyclopenta[b,h]fluorenyl group, with 1,1,4,4,7,7,10,10-octamethyl-2,3,4,7,8,9,10,12-octahydro-1H-dibenzo[b,h]fluorenyl group being particularly preferable.

$R_{8b}$ is preferably a hydrogen atom.

$R_{9b}$ is preferably a hydrocarbon group, more preferably a C2 or higher alkyl group, a cycloalkyl group or a cycloalkenyl group, and still more preferably a C2 or higher alkyl group.

From the point of view of synthesis, it is also preferable that $R_{10b}$ and $R_{11b}$ be each a hydrogen atom.

In other cases, it is more preferable that when n=1, $R^{9b}$ and $R^{10b}$ bond to each other to form a ring, and it is particularly preferable that the ring be a 6-membered ring such as a cyclohexane ring. In this case, $R_{11b}$ is preferably a hydrogen atom.

In other cases, $R_{8b}$ and $R_{9b}$ may be each a hydrocarbon group.

$R^{12b}$ is preferably a hydrocarbon group, and more preferably an alkyl group.

n is an integer of 1 to 3, preferably 1 or 2, and more preferably 1.

For example, particularly preferred metallocene compounds represented by the formula (IV) are (8-octamethylfluoren-12'-yl-(2-(adamantan-1-yl)-8-methyl-3,3b,4,5,6,7,7a,8-octahydrocyclopenta[a]indene))zirconium dichloride, [3-(2',7'-di-tert-butylfluorenyl) (1,1,3-trimethyl-5-(1-adamantyl)-1,2,3,3a-tetrahydropentalene)]zirconium dichloride and (8-(2,3,6,7-tetramethylfluoren)-12'-yl-(2-(adamantan-1-yl)-8-methyl-3,3b,4,5,6,7,7a,8-octahydrocyclopenta[a]indene))zirconium dichloride. Here, the octamethylfluorene is 1,1,4,4,7,7,10,10-octamethyl-2,3,4,7,8,9,10,12-octahydro-1H-dibenzo[b,h]fluorene.

(Cocatalysts)

The metallocene catalyst preferably further includes at least one compound (cocatalyst) selected from organometallic compounds, organoaluminum oxy compounds, and compounds capable of reacting with the metallocene compound to form an ion pair.

Examples of the organometallic compounds (except organoaluminum oxy compounds) include organoaluminum compounds, specifically, organoaluminum compounds represented by the general formula $R_m{}^aAl(OR^b)_nH_pX_q$ (wherein $R^a$ and $R^b$ may be the same as or different from each other and are each a hydrocarbon group having 1 to 15 carbon atoms, preferably 1 to 4 carbon atoms, X is a halogen atom, $0<m\leq3$, $0\leq n<3$, $0\leq p<3$, $0\leq q<3$, and m+n+p+q=3). Specific examples include trialkylaluminums such as trimethylaluminum, triethylaluminum, triisobutylaluminum and tri-n-octylaluminum, dialkylaluminum hydrides such as diisobutylaluminum hydride, and tricycloalkylaluminums such as tricyclohexylaluminum.

The organoaluminum oxy compounds may be conventionally known aluminoxanes or may be benzene-insoluble organoaluminum oxy compounds such as those described in JP-A-H02-78687. Specific examples include methylaluminoxane.

Suitable aluminoxanes are solid aluminoxanes serving as solid cocatalyst components. For example, solid aluminoxanes disclosed in WO 2010/055652, WO 2013/146337 and WO 2014/123212 are particularly suitably used.

The term "solid" means that the aluminoxane substantially stays in solid state in a reaction environment in which the solid aluminoxane is used. More specifically, when, for example, the components for constituting the metallocene catalyst are brought into contact with one another to form a solid catalyst component, the aluminoxane stays in solid state in an inert hydrocarbon medium such as hexane or toluene used in the reaction in a specific temperature-pressure environment.

The solid aluminoxane preferably includes an aluminoxane that has at least one kind of structural units selected from structural units represented by the formula (1) and structural units represented by the formula (2); more preferably comprises an aluminoxane that has structural units represented by the formula (1); and more preferably comprises polymethylaluminoxane that consists solely of structural units represented by the formula (1).

In the formula (1), Me is a methyl group.

In the formula (2), $R^1$ is a C2-C20 hydrocarbon group, preferably a C2-C15 hydrocarbon group, and more preferably a C2-C10 hydrocarbon group. Examples of the hydrocarbon groups include alkyl groups such as ethyl, propyl, n-butyl, pentyl, hexyl, octyl, decyl, isopropyl, isobutyl, sec-butyl, tert-butyl, 2-methylbutyl, 3-methylbutyl, 2-methylpentyl, 3-methylpentyl, 4-methylpentyl, 2-methylhexyl, 3-methylhexyl and 2-ethylhexyl; cycloalkyl groups such as cyclohexyl and cyclooctyl; and aryl groups such as phenyl and tolyl.

The structure of the solid aluminoxane is not necessarily clear but probably has, in a usual case, about 2 to 50 repetitions of the structural units represented by the formula (1) and/or the formula (2). However, the structure is not limited thereto. The manner in which the structural units are bonded is variable and is, for example, linear, cyclic or clustered, and the aluminoxane is probably usually a single such aluminoxane or a mixture of such aluminoxanes. The aluminoxane may consist solely of the structural units represented by the formula (1) or the formula (2).

The solid aluminoxane is preferably a solid polymethylaluminoxane, and is more preferably solid polymethylaluminoxane consisting solely of the structural units represented by the formula (1).

The solid aluminoxane is usually in the form of particles and preferably has a volume median diameter (D50) of 1 to 500 μm, more preferably 2 to 200 μm, and still more preferably 5 to 50 μm. For example, D50 may be determined by a laser diffraction/scattering method using Microtrac MT3300EX II manufactured by Microtrac.

The solid aluminoxane usually has a uniformity index described in the section of Examples later of not more than 0.40, preferably not more than 0.30, and more preferably not more than 0.27. The lower limit of the uniformity index is not particularly limited and may be, for example, 0.15. A larger uniformity index indicates wider particle size distribution.

The solid aluminoxane preferably has a specific surface area of 100 to 1000 $m^2/g$, and more preferably 300 to 800 $m^2/g$. The specific surface area may be determined from the BET adsorption isotherm equation utilizing the adsorption and desorption phenomena of gas on the solid surface.

For example, the solid aluminoxane may be prepared by the method described in WO 2010/055652 or WO 2014/123212.

Examples of the compounds capable of reacting with the metallocene compound to form an ion pair include Lewis acids, ionic compounds, borane compounds and carborane compounds described in literature such as JP-A-H01-501950, JP-A-H01-502036, JP-A-H03-179005, JP-A-H03-179006, JP-A-H03-207703, JP-A-H03-207704 and U.S. Pat. No. 5,321,106. Examples further include heteropoly compounds and isopoly compounds.

(Carriers)

The metallocene catalyst may further include a carrier. The carrier is preferably in the form of particles. The metallocene compound is immobilized on the surface and/or in the inside of the carrier, thus forming the metallocene catalyst. The catalyst of such a form is generally called a metallocene supported catalyst.

The solid aluminoxane described hereinabove functions as a carrier. Thus, the use of the solid aluminoxane may eliminate the use of the carrier, for example, a solid inorganic carrier such as silica, alumina, silica-alumina or magnesium chloride, or a solid organic carrier such as polystyrene beads.

The carrier includes, for example, an inorganic or organic compound. Examples of the solid inorganic carriers include inorganic compound carriers such as porous oxides, inorganic halides, clays, clay minerals and ion-exchangeable layered compounds. Examples of the solid organic carriers include such carriers as polystyrene beads.

Examples of the porous oxides include oxides such as $SiO_2$, $Al_2O_3$, MgO, $ZrO_2$, $TiO_2$, $B_2O_3$, CaO, ZnO, BaO and $ThO_2$, and composites or mixtures including these oxides, for example, natural or synthetic zeolites, $SiO_2$-MgO, $SiO_2$-$Al_2O_3$, $SiO_2$-$TiO_2$, $SiO_2$-$V_{205}$, $SiO_2$-$Cr_2O_3$ and $SiO_2$-$TiO_2$-MgO.

Examples of the inorganic halides include $MgCl_2$, $MgBr_2$, $MnCl_2$ and $MnBr_2$. The inorganic halide may be used directly or may be used after being pulverized with a ball mill or a vibration mill. Alternatively, the inorganic halide may be dissolved into a solvent such as alcohol and then precipitated into fine particles with a precipitant.

The clays are usually composed of clay minerals as main components. The ion-exchangeable layered compounds are compounds having a crystal structure in which planes formed by bonds such as ionic bonds are stacked in parallel on top of one another with a weak bond strength, and in which the ions contained therein are exchangeable. Most clay minerals are ion-exchangeable layered compounds. Examples of the clays, the clay minerals and the ion-exchangeable layered compounds include clays, clay minerals and ion crystalline compounds having a layered crystal structure such as a hexagonal closest packed structure, an antimony structure, a $CdCl_2$ structure or a $CdI_2$ structure.

It is also preferable that the clays and the clay minerals be subjected to chemical treatment. Any chemical treatments may be used, with examples including surface treatment that removes impurities on the surface and treatment that modifies the crystal structure of the clay. Specific examples of the chemical treatments include acid treatments, alkali treatments, salt treatments and organic treatments.

The carrier preferably has a volume median diameter (D50) of 1 to 500 µm, more preferably 2 to 200 µm, and still more preferably 5 to 50 µm. For example, the volume D50 may be determined by a laser diffraction/scattering method using Microtrac MT3300EX II manufactured by Microtrac.

(Organic Compound Components)

The metallocene catalyst may further include an organic compound component as required. The organic compound component is used as required for the purpose of enhancing the polymerization performance and properties of a polymer that is obtained. Examples of the organic compound components include alcohols, phenolic compounds, carboxylic acids, phosphorus compounds, amides, polyethers and sulfonate salts.

<Polymerization Conditions>

On the solid catalyst component in which the metallocene compound is supported on the carrier such as a solid cocatalyst component, an olefin such as an α-olefin may be prepolymerized (a prepolymerized catalyst component). An additional catalyst component may be supported on the solid catalyst component carrying such a prepolymer.

In the polymerization of propylene, the manner and order in which the components for the metallocene catalyst are used and added may be selected appropriately. In the polymerization of propylene using the metallocene catalyst, the components for constituting the catalyst may be used in the following amounts.

The metallocene compound is usually used in such an amount that the concentration thereof per liter of the reaction volume will be $10^{-10}$ to $10^{-2}$ mol, preferably $10^{-9}$ to $10^{-3}$ mol The organometallic compound as a cocatalyst may be usually used in such an amount that the molar ratio [organometallic compound/M] of the compound to the transition metal atoms (M; that is, the Group IV transition metal in the periodic table) in the metallocene compound will be 10 to 10000, preferably 30 to 2000, and more preferably 50 to 500.

The organoaluminum oxy compound as a cocatalyst may be usually used in such an amount that the molar ratio [Al/M] of aluminum atoms (Al) in the compound to the transition metal atoms (M) in the metallocene compound will be 10 to 10000, preferably 30 to 2000, and more preferably 50 to 500.

The compound capable of reacting with the metallocene compound to form an ion pair (the ion pair-forming compound) may be usually used as a cocatalyst in such an amount that the molar ratio [ion pair-forming compound/M] of the compound to the transition metal atoms (M) in the metallocene compound will be 1 to 10000, preferably 2 to 2000, and more preferably 10 to 500.

The propylene polymer (B) may be obtained by polymerizing at least propylene in the presence of the metallocene catalyst described above.

The polymerization may be carried out by any of liquid-phase polymerization processes such as solution polymerization and suspension polymerization, and gas-phase polymerization processes. In the liquid-phase polymerization processes, inert organic solvents may be used as the polymerization solvents, with examples including aliphatic hydrocarbons such as propane, butane, pentane, hexane, heptane, octane, decane, dodecane and kerosine; alicyclic hydrocarbons; aromatic hydrocarbons; and halogenated hydrocarbons. The olefin itself such as propylene may be used as the polymerization medium.

Hydrogen molecules may be added to the polymerization system in order to control the molecular weight of the polymer. When hydrogen is added to the system, the amount thereof is appropriately about 0.00001 to 100 NL per mole of the olefin. Other than by adjusting the amount of hydrogen supplied, the hydrogen concentration in the system may be controlled by performing a hydrogen-forming or hydrogen-consuming reaction in the system, separating hydrogen with a membrane, or discharging part of gas containing hydrogen out of the system.

The organometallic compound (except the organoaluminum oxy compound) described hereinabove may be further added for the purpose of scavenging the poisoning of the polymerization catalyst component in the polymerization system. When such an organometallic compound is added to the system, the amount thereof is usually $10^{-6}$ to 0.1 mol, and preferably $10^{-5}$ to $10^{-2}$ mol per liter of the reaction volume.

Further, an antistatic agent may be added to the polymerization system. Some preferred antistatic agents are polypropylene glycol, polypropylene glycol distearate, ethylenediamine-polyethylene glycol (PEG)-polypropylene glycol (PPG) block copolymer, stearyldiethanolamine, lauryldiethanolamine, alkyldiethanolamides and polyoxyalkylenes (for example, polyethylene glycol-polypropylene glycol-polyethylene glycol block copolymer (PEG-PPG-PEG)). Polyoxyalkylene (PEG-PPG-PEG) is particularly preferable. The antistatic agent is usually used in such an amount that the ratio (g/mol) of the mass (g) to 1 mol of the transition metal atoms (M) in the metallocene compound will be 100 to 100,000, and preferably 100 to 10,000.

The polymerization may be carried out, for example, at a temperature of 20 to 150° C., preferably 50 to 100° C., under a pressure of atmospheric pressure to 10 MPaG, preferably atmospheric pressure to 5 MPaG. The polymerization may be performed batchwise, semi-continuously or continuously. The polymerization may be carried out in two or more stages under different reaction conditions.

<Propylene Polymers (C)>

The propylene polymer (C) has an intrinsic viscosity [η] measured in a tetralin solvent at 135° C. in the range of not less than 0.54 dl/g and less than 2.6 dl/g, preferably in the range of 0.60 to 2.0 dl/g, and more preferably in the range of 0.80 to 1.5 dl/g. When the intrinsic viscosity [η] of the propylene polymer (C) is in the above range, the polymer composition tends to attain excellent shaping properties.

Examples of the propylene polymers (C) include homopolymers of propylene, and copolymers of propylene and a C2-C20 α-olefin (except propylene). Examples of the C2-C20 α-olefins include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. Ethylene is preferable as the α-olefin. The α-olefins may be used singly, or two or more may be used in combination.

In the copolymer of propylene and the C2-C20 α-olefin, the content of propylene-derived structural units is usually more than 90 mol % and less than 100 mol %, and preferably 93 to 99 mol %, and the content of C2-C20 α-olefin (except propylene)-derived structural units is usually more than 0 mol % and less than 10 mol %, and preferably 1 to 7 mol %, to the total of the number of propylene-derived structural units and the number of C2-C20 α-olefin-derived structural units. These contents may be measured by $^{13}$C-NMR. In an embodiment, the copolymer is a random copolymer.

The propylene polymer (C) may be produced by any method without limitation and may be prepared by, for example, homopolymerizing propylene or copolymerizing propylene and an additional monomer in the presence of a Ziegler-Natta catalyst or a metallocene catalyst. Examples of the catalysts include those catalysts described in literature such as JP-A-2014-214202, JP-A-2016-084387, WO 2019/004418 and JP-A-2007-224179. Regarding the conditions in the production of the propylene polymer (C), reference may be made to the literature above, for example, paragraphs [0053] to [0077] of JP-A-2014-214202, paragraphs [0052] to [0075] of JP-A-2016-084387, and paragraphs [0100] to [0110] of WO 2019/004418.

The propylene polymer (C) may be produced by the method described in the section of Production conditions of the propylene homopolymer (A).

For example, the propylene polymer (C) satisfying the above properties, and an ethylene random copolymer (D) may also be produced in one polymerization system or two or more polymerization systems. In the above method, a propylene polymer mixture including the propylene polymer (C) and the ethylene random copolymer (D) may be obtained by multistage polymerization of two or more stages. For example, these polymers may be obtained by so-called block copolymerization in which the propylene polymer (C) is obtained in the former stage and subsequently the ethylene random copolymer (D) is obtained in the presence of the propylene polymer (C) in the latter stage.

The propylene polymers (C) may be used singly, or two or more may be used in combination.

<Ethylene Random Copolymers (D)>

The composition of the present invention preferably further includes the ethylene random copolymer (D) from the point of view of, for example, an enhancement in impact resistance of shaped articles that are obtained.

Examples of the ethylene random copolymer (D) include random copolymers of ethylene and a C3-C20 α-olefin. Examples of the C3-C20 α-olefins include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. Among these, propylene, 1-butene, 1-hexene and 1-octene are preferable. The α-olefins may be used singly, or two or more may be used in combination.

In the ethylene random copolymer (D), the content of ethylene-derived structural units is usually not less than 10 mol %, preferably 20 to 95 mol %, and more preferably 30 to 90 mol %, and the content of C3-C20 α-olefin-derived structural units is usually not more than 90 mol %, preferably 5 to 80 mol %, and more preferably 10 to 70 mol %, to the total of the number of ethylene-derived structural units and the number of C3-C20 α-olefin-derived structural units. These contents may be measured by $^{13}$C-NMR.

The ethylene random copolymer (D) usually has an intrinsic viscosity [ii] measured in a tetralin solvent at 135° C. in the range of 0.5 to 9.0 dl/g, preferably 0.7 to 8.0 dl/g, and more preferably 1.0 to 7.5 dl/g.

The ethylene random copolymers (D) may be used singly, or two or more may be used in combination.

<Inorganic Fillers (E)>

The composition of the present invention preferably further includes an inorganic filler (E) from the point of view of, for example, an enhancement in rigidity.

Examples of the inorganic fillers (E) include talc, clay, mica, calcium carbonate, magnesium hydroxide, ammonium phosphate salt, silicate salts, carbonate salts, carbon blacks; and inorganic fibers such as magnesium sulfate fibers, glass fibers and carbon fibers.

The inorganic fillers (E) may be used singly, or two or more may be used in combination.

<Contents of Components>

In the composition of the present invention, the content of the propylene homopolymer (A) is 0.5 to 47.5 mass %, the content of the propylene polymer (B) is 5 to 95 mass % and the content of the propylene polymer (C) is 2.5 to 85.5 mass %, and preferably, the content of the propylene homopolymer (A) is 1 to 45 mass %, the content of the propylene polymer (B) is 5 to 90 mass % and the content of the propylene polymer (C) is 3 to 85 mass %, based on the total of the propylene homopolymer (A), the propylene polymer (B) and the propylene polymer (C).

When the content of the propylene homopolymer (A) is less than 0.5 mass %, shaped articles that are obtained tend to be insufficient in rigidity. When the content is more than 47.5 mass %, shaped articles that are obtained tend to cause poor appearances (for example, the occurrence of aggregates).

When the content of the propylene polymer (B) is less than 5 mass %, the propylene polymer composition tends to be insufficient in fluidity and shaped articles tend to be inferior in rigidity. When the content is more than 95 mass %, low strength tends to be exhibited.

In the present invention, use of the high-molecular propylene homopolymer (A) and the high-fluidity propylene polymer (B) respectively in specified amounts is assumed to promote orientational crystallization of propylene polymers and increase the thickness of an orientation layer, and is considered to enable shaped articles to be enhanced in rigidity while maintaining impact resistance.

When the content of the propylene polymer (C) is in the above range, a propylene polymer composition that is obtained tends to attain excellent shaping properties.

The content of the ethylene random copolymer (D) based on the total of the propylene homopolymer (A), the propylene polymer (B), the propylene polymer (C), the ethylene random copolymer (D) and the inorganic filler (E) is preferably 0 to 40 mass %, more preferably 0 to 38 mass %, and still more preferably 0 to 36 mass %. The content is preferably 20 to 40 mass %, more preferably 20 to 38 mass %, and still more preferably 20 to 36 mass % from the viewpoint that shaped articles attain a well-balanced excellent rigidity and impact resistance and attain a low coefficient of linear expansion. The content is preferably 0 to 20 mass %, more preferably 0 to 15 mass %, and still more preferably 0 to 10 mass % from the viewpoint that shaped articles attain excellent rigidity.

The content of the inorganic filler (E) based on the total of the propylene homopolymer (A), the propylene polymer (B), the propylene polymer (C), the ethylene random copolymer (D) and the inorganic filler (E) is preferably 0 to 50 mass %, more preferably 0 to 45 mass %, and still more preferably 0 to 40 mass %.

<Additional Components>

While still achieving the objects of the present invention, the composition of the present invention may include additional components other than the components described above. Examples of such additional components include resins, rubbers, nucleating agents, heat stabilizers, weather stabilizers, antistatic agents, antislip agents, antiblocking agents, antifogging agents, lubricants, pigments, dyes, plasticizers, antiaging agents, hydrochloric acid absorbers and antioxidants.

Examples of the nucleating agents include organic nucleating agents such as phosphate nucleating agents (organic phosphoric acid metal salts), sorbitol nucleating agents, metal salts of aromatic carboxylic acids, metal salts of aliphatic carboxylic acids and rosin compounds; and inorganic nucleating agents such as inorganic compounds.

Examples of the commercially available nucleating agents include phosphate nucleating agent "ADK STAB NA-11" (manufactured by ADEKA CORPORATION), sorbitol nucleating agent "Millad NX8000" (manufactured by Milliken), aliphatic carboxylic acid metal salt nucleating agent "Hyperform HPN-20E" (manufactured by Milliken) and rosin compound nucleating agent "PINECRYSTAL KM1610" (manufactured by ARAKAWA CHEMICAL INDUSTRIES, LTD.).

The nucleating agents may be used singly, or two or more may be used in combination.

In an embodiment, the content of the nucleating agent in the composition of the present invention is preferably 0.01 to 1 mass %, more preferably 0.02 to 0.8 mass %, and still more preferably 0.03 to 0.5 mass %.

<Methods for Producing Propylene Polymer Composition>

The propylene polymer composition of the present invention may be produced by mixing the components described hereinabove. The components may be added sequentially in any order or may be mixed together at the same time. Alternatively, a multistage mixing method may be adopted in which part of the components are mixed and thereafter the remaining part of the components are mixed.

For example, the propylene polymer composition may be produced by mixing the propylene polymer mixture including the propylene homopolymer (A) having a relatively high-molecular weight and the propylene polymer (C) having a relatively low-molecular weight, the mixture being obtained in the multistage polymerization of two or more stages, the propylene polymer (B), and, additionally as required, the propylene polymer (C) and the ethylene random copolymer (D). An additive may be added as required.

For example, the components may be added in such a manner that the components are mixed or melt-kneaded simultaneously or sequentially using a mixing device such as a Banbury mixer, a single-screw extruder, a twin-screw extruder or a high-speed twin-screw extruder. The resin temperature in melt-kneading is usually 180 to 280° C. and preferably 180 to 260° C.

The composition of the present invention preferably has a melt flow rate (MFR) measured at 230° C. and a load of 2.16 kg of 1 to 200 g/10 min, more preferably 3 to 160 g/10 min, and still more preferably 5 to 120 g/10 min. This range of MFR is advantageous in that the composition attains a well-balanced shaping properties and mechanical strength.

[Shaped Articles]

A shaped article of the present invention is formed using at least the composition of the present invention.

The shaped articles of the present invention may be suitably used in various fields such as automobile parts, home appliance parts, food containers and medical containers, and are particularly suitable as automobile parts. Examples of the automobile parts include automobile interior and exterior members such as bumpers, pillars and instrumental panels; automobile functional members such as engine fans and fan shrouds; and outer panels such as roofs, door panels and fenders.

The shaped articles of the present invention may be formed by any methods without limitation. Any of various known methods for shaping polymer compositions may be adopted. Injection molding and press molding are particularly preferable.

EXAMPLES

Hereinafter, the present invention will be described in greater detail based on Examples. However, it should be construed that the scope of the present invention is not limited to such Examples. In the following description, "parts by mass" is simply written as "parts" unless otherwise specified.

[Methods for Measuring Properties]

(1) The respective mass fractions of the propylene polymer (corresponding to the propylene homopolymer (A)) obtained in the first stage and the propylene polymer (corresponding to the propylene polymer (C)) obtained in the second or later stage, in Production Examples α-1, α-2 and α-3, were determined from the removal amount of heat of reaction generated in polymerization.

(2) The intrinsic viscosity [η] (dl/g) was measured in a tetralin solvent at 135° C. The intrinsic viscosity [η]2 of the propylene polymer (corresponding to the propylene polymer (C)) obtained in the second or later stage, in Production Examples α-1, α-2 and α-3, was a value calculated by the following equation.

$$[\eta]_2 = ([\eta]_{total} \times 100 - [\eta]_1 \times W_1)/W_2$$

$[\eta]_{total}$: the intrinsic viscosity of the entire propylene polymer $[\eta]_1$: the intrinsic viscosity of the propylene polymer obtained in the first stage $W_1$: the mass fraction (%) of the propylene polymer obtained in the first stage $W_2$: the mass fraction (%) of the propylene polymer in the second or later stage (3) The melt flow rate (MFR) (g/10 min) was measured in accordance with JIS-K7210 at a measurement temperature of 230° C. under a load of 2.16 kgf (21.2 N).

(4) Gel Permeation Chromatography (GPC)

Gel permeation chromatography (GPC) was performed with the device described below under the conditions described below, and the chromatogram obtained was analyzed by a known method to calculate values of Mw, Mn and Mw/Mn.

(GPC Measurement Device)

Liquid chromatograph: HLC-8321GPC/HT manufactured by TOSOH CORPORATION
Detector: RI
Column: Two TOSOH GMHHR—H(S)HT columns manufactured by TOSOH CORPORATION were connected in series.
(Measurement Conditions)
Mobile phase medium: 1,2,4-Trichlorobenzene
Flow rate: 1.0 ml/min
Measurement temperature: 145° C.
Calibration curve preparation: A calibration curve was prepared using standard polystyrene samples.
Molecular weight conversion: The molecular weight was converted from PS (polystyrene) to PP (polypropylene) by a universal calibration method.
Sample concentration: 5 mg/10 ml
Sample solution volume: 300 μl (5) Temperature Rising Elution Fractionation (TREF)

Temperature rising elution fractionation (TREF) was performed under the following measurement conditions, and the proportion of components eluted at not more than −20° C. was calculated.

Device: CFC2 type cross fractionation chromatograph manufactured by Polymer Char
Detector: IR4 type infrared spectrophotometer (built-in) manufactured by Polymer Char
Mobile phase: o-Dichlorobenzene, BHT added
Flow rate: 1.0 mL/min
Sample concentration: 90 mg/30 mL
Injection volume: 0.5 mL
Dissolution conditions: 145° C., 30 min
Stabilization conditions: 135° C., 30 min
Cooling rate: 1.0° C./min
Elution sections: −20° C. to 0° C. in 10° C. increments, 0° C. to 80° C. in 5° C. increments, 80° C. to 104° C. in 3° C. increments, 104 to 130° C. in 2° C. increments
Elution time: 3 min (6) Ethylene Content in Propylene/Ethylene Copolymers To determine the content (ethylene content) of ethylene-derived structural units, a sample weighing 20 to 30 mg was dissolved into 0.6 ml of a 1,2,4-trichlorobenzene/deuterated benzene (2:1) solution, and the solution was subjected to carbon nuclear magnetic resonance analysis ($^{13}$C-NMR). Propylene and ethylene were quantitatively determined based on the diad sequence distribution. In the case of a propylene/ethylene copolymer, the amounts were calculated from the following equations wherein PP=Sαα, EP=Sαγ+Sαβ, and EE=½(Sβδ+Sδδ)+¼Sγδ.

Content of propylene-derived structural units (mol %)=(PP+½EP)×100/[(PP+½EP)+(½EP+EE)]
Content of ethylene-derived structural units (mol %)=(½EP+EE)×100/[(PP+½EP)+(½EP+EE)]

Sαα etc. are each an intensity of a peak which is a value analyzed in accordance with the method described in J. C. Randall (Review Macromolecular Chemistry Physics, C29, 201 (1989)).

(7) Amount of Decane-Soluble Components

Approximately 3 g of a propylene block copolymer (the weight was measured to the unit of $10^{-4}$ g; this weight being written as b (g) in the equation below), 500 ml of n-decane and a small amount of a heat stabilizer soluble in n-decane were added into a glass measurement container. In a nitrogen atmosphere, the temperature was raised to 150° C. in 2 hours while performing stirring with a stirrer, and the propylene block copolymer was dissolved. The temperature was held at 150° C. for 2 hours and was then gradually lowered to 23° C. over a period of 8 hours. The resultant liquid containing a precipitate of the propylene block copolymer was filtered under reduced pressure through a 25G-4 standard glass filter manufactured by Iwata Glass. A 100 ml portion of the filtrate was collected and was dried under reduced pressure to give part of the decane-soluble components. The weight thereof was measured to the unit of $10^{-4}$ g (this weight is written as a (g) in the equation below). After these operations, the amount of decane-soluble components was determined from the following equation.

Content of 23° C. decane-soluble components (Dsol)=100×(500×a)/(100×b)

(8) Zirconium Content in Prepolymerized Catalyst Components

The zirconium content in a prepolymerized catalyst component was measured using an ICP emission spectroscopic analyzer (ICPS-8100) manufactured by SHIMADZU COR- PORATION. A sample was wet-decomposed with sulfuric acid and nitric acid, and the volume was adjusted to a predetermined volume (filtration and dilution were performed where necessary). The test solution thus obtained was analyzed, and the zirconium content was determined from a calibration curve prepared using standard samples having a known concentration.

(9) Volume Median Diameter (D50), Particle Size Distribution and Uniformity of Solid Cocatalyst Components The volume median diameter (median diameter, D50) and particle size distribution of a solid cocatalyst component were determined by a laser diffraction/scattering method using Microtrac MT3300EX II manufactured by Microtrac. In the measurement of the particle size distribution, the solid cocatalyst component was inactivated beforehand in a wet desiccator under a stream of nitrogen to give a sample. Methanol was used as the main dispersion medium.

The uniformity of the solid cocatalyst component particles was evaluated based on the uniformity index represented by the following equation.

$$\text{Uniformity index} = \Sigma Xi|D50 - Di|/D50\Sigma Xi$$

In the equation, Xi indicates the histogram value of a particle i in the particle size distribution measurement, D50 indicates the volume median diameter, and Di indicates the volume diameter of the particle i. The Xi, D50 and Di of the solid cocatalyst component particles were determined by the laser diffraction/scattering method.

Unless otherwise mentioned, all Examples were carried out in a dry nitrogen atmosphere using a dry solvent.

Production Example α-1

(1) Preparation of Magnesium Compound

A reaction tank (500 L internal volume) equipped with a stirrer was thoroughly purged with nitrogen gas, 97.2 kg of ethanol, 640 g of iodine and 6.4 kg of metallic magnesium were added and reacted in reflux conditions while performing stirring until no hydrogen gas was generated from the system, and a solid reaction product was obtained. A reaction liquid including the solid reaction product was dried under reduced pressure, and an objective magnesium compound (carrier of solid catalyst component) was obtained.

(2) Preparation of Solid Titanium Catalyst Component (a-1)

30 kg of the magnesium compound (not pulverized), 150 L of purified heptane (n-heptane), 4.5 L of silicon tetrachloride and 5.4 L of di-n-butyl phthalate were added to a reaction tank (500 L internal volume) thoroughly purged with nitrogen gas and equipped with a stirrer. The system was maintained at 90° C., 144 L of titanium tetrachloride was added while performing stirring and reacted at 110° C. for 2 hours, and then a solid component was separated and washed with purified heptane at 80° C. Furthermore, 228 L of titanium tetrachloride was added, reacted at 110° C. for 2 hours, and sufficiently washed with purified heptane, and thus, a solid titanium catalyst component (α-1) was obtained.

(3) Production of Prepolymerized Catalyst (b-1)

10 mmol of triethylaluminum, 2 mmol of dicyclopentyldimethoxysilane, and 1 mmol, in terms of titanium atoms, of the solid titanium catalyst component (a-1) obtained in (2) above were added into 200 mL of heptane. While maintaining the internal temperature at 20° C., propylene was continuously introduced while performing stirring. After 60 minutes, stirring was terminated, and consequently a prepolymerized catalyst (b-1) slurry in which 4.0 g of propylene was polymerized per gram of the solid titanium catalyst component (α-1) was obtained.

(4) Polymerization

336 L of propylene was fed to a 600 L autoclave, and the temperature was raised to 60° C. Thereafter, 8.7 mL of triethylaluminum, 11.4 mL of dicyclopentyldimethoxysilane, and 2.9 g, in terms of the solid titanium catalyst component (a-1), of the prepolymerized catalyst (b-1) slurry obtained in (3) were fed, and polymerization was started. After 75 minutes from the start of the polymerization, cooling was performed to 50° C. over a period of 10 minutes (the polymerization in the first stage was terminated).

A propylene homopolymer (A-1) obtained by polymerization in the same conditions as in the first stage had an intrinsic viscosity [η] of 11 dl/g.

After cooling, hydrogen was continuously added so that the pressure was constantly 3.3 MPaG, and polymerization was performed for 151 minutes. Next, a vent valve was opened, and unreacted propylene was purged through an integrating flowmeter (the polymerization in the second stage was terminated).

Thus, 51.8 kg of a powdery propylene polymer was obtained. The proportion of the propylene homopolymer (A-1) produced in the polymerization in the first stage and the proportion of the propylene homopolymer (C-1) produced in the polymerization in the second stage, in the propylene polymer finally obtained, respectively calculated from material balances, were 25 mass % and 75 mass %, and the propylene homopolymer (C-1) had an intrinsic viscosity [ii] of 0.99 dl/g.

2000 ppm of IRGANOX 1010 (manufactured by BASF SE), 2000 ppm of IRGAFOS 168 (manufactured by BASF SE), 1000 ppm of SANDSTAB P-EPQ (manufactured by Clariant Japan K.K.) as antioxidants, and 1000 ppm of calcium stearate as a neutralizer were added to the propylene polymer, and melt-kneaded with a twin-screw extruder (TEM35BS) manufactured by Toshiba Machine Co., Ltd. to give pellets of a propylene polymer. The propylene polymer thus finally obtained had an MFR of 1.2 g/10 min.

Production Example α-2

<Preparation of Solid Titanium Catalyst Component (a-2)>

After 95.2 g of anhydrous magnesium chloride, 442 ml of decane and 390.6 g of 2-ethylhexyl alcohol were heated and reacted at 130° C. for 2 hours to provide a uniform solution, 21.3 g of phthalic anhydride was added into the solution and furthermore stirred and mixed at 130° C. for 1 hour to dissolve phthalic anhydride.

The uniform solution thus obtained was cooled to room temperature, and thereafter 75 ml of this uniform solution was fed dropwise over 1 hour into 200 ml of titanium tetrachloride maintained at −20° C. After the completion of the feeding, the temperature of the mixed liquid was raised to 110° C. over a period of 4 hours, 5.22 g of diisobutyl phthalate (DIBP) was added when the temperature reached 110° C., and then the mixture was stirred and maintained at that temperature for 2 hours.

After the completion of the reaction for 2 hours, a solid portion was collected by thermal filtration, and this solid portion was resuspended in 275 ml of titanium tetrachloride, and then again heated at 110° C. for 2 hours. After the completion of the reaction, the solid portion was again collected by thermal filtration, and sufficiently washed with decane and hexane at 110° C. until a free titanium compound in the solution was not detected.

The detection of this free titanium compound was confirmed by the following method. 10 ml of the supernatant of the solid catalyst component was collected with a syringe and fed to a 100 ml side-arm Schlenk flask purged with nitrogen in advance. Next, the solvent hexane was dried with a stream of nitrogen, and further vacuum dried for 30 minutes. 40 ml of ion-exchange water and 10 ml of (1+1) sulfuric acid were fed thereto and stirred for 30 minutes. Such an aqueous solution was transferred through a paper filter to a 100 ml measuring flask, and subsequently 1 ml of $H_3PO_4$ (aqueous solution of a concentration of 85%) as a masking agent for iron (II) ions and 5 ml of 3% $H_2O_2$ as a coloring agent for titanium were added, and further diluted in the measuring flask to 100 ml with ion-exchange water. The measuring flask was shaken for mixing, the absorbance at 420 nm was observed with UV after 20 minutes, and the free titanium compound was removed by washing until the absorption was not observed.

The solid titanium catalyst component (a-2) prepared as described above was stored as a decane slurry, and partially dried for the purpose of examination of the chemical makeup of the catalyst. The chemical makeup of the solid titanium catalyst component (a-2) thus obtained included 2.3 mass % of titanium, 61 mass % of chlorine, 19 mass % of magnesium and 12.5 mass % of DIBP.

[Preparation of Prepolymerized Catalyst (b-2)]

Under a nitrogen atmosphere, 150 L of purified heptane, 61.6 ml of triethylaluminum and 150 g of the solid titanium catalyst component (a-2) obtained above were fed to a 200 L autoclave equipped with a stirrer, then 900 g of propylene was introduced thereinto, and the mixture was reacted for 1 hour at a temperature maintained at not higher than 20° C.

After the completion of the polymerization, a reactor was purged with nitrogen, the supernatant was removed, and the residue was washed three times with purified heptane. The prepolymerized catalyst obtained was resuspended in purified heptane and transferred to a catalyst supply tank. The concentration of the solid titanium catalyst component (a-2) was adjusted to 1.0 g/L by the addition of purified heptane. A prepolymerized catalyst slurry was thus obtained. The prepolymerized catalyst (b-2) slurry contained 6 g of polypropylene per gram of the solid titanium catalyst component (a-2).

[Production of Propylene Polymer]

A 1000 L internal volume first polymerization vessel equipped with a stirrer was charged with 300 L of propylene. While maintaining this liquid level, 113.5 kg/h of propylene, 1.5 g/h, in terms of solid of the titanium catalyst component (a-2), of the prepolymerized catalyst (b-2) slurry, 6.0 mL/h of triethylaluminum, and 13.8 mL/h of dicyclopentyldimethoxysilane were continuously supplied. The polymerization was carried out at a polymerization temperature of 70° C. and a pressure of 2.86 MPaG under hydrogen blocking.

The slurry thus obtained was fed to a 500 L internal volume second polymerization vessel equipped with a stirrer for further polymerization. The second polymerizer was charged with 300 L of propylene. While maintaining this liquid level, 47 kg/h of propylene and hydrogen at a rate to keep the hydrogen concentration in the gas phase at 7.7 mol % were supplied. The polymerization was carried out at a polymerization temperature of 61° C. and a pressure of 2.80 MPaG.

The slurry thus obtained was fed to a 500 L internal volume third polymerization vessel equipped with a stirrer for further polymerization. The third polymerizer was charged with 270 L of propylene. While maintaining this liquid level, 16 kg/h of propylene and hydrogen at a rate to keep the hydrogen concentration in the gas phase at 7.8 mol % were supplied. The polymerization was carried out at a polymerization temperature of 60° C. and a pressure of 2.73 MPaG.

The slurry thus obtained was added to a 2.4 L internal volume liquid transfer tube and was gasified to perform gas-solid separation, and thus a propylene polymer was obtained. The propylene polymer obtained was vacuum dried at 80° C. The propylene polymer obtained had an MFR of 3.6 g/10 min.

The proportion of the propylene polymer produced in the first polymerizer, in the propylene polymer finally obtained, was determined from the removal amount of heat of reaction generated in the polymerization, and was 20 mass %.

Production Example β-1

(1) Preparation of Metallocene Compound (1)

In accordance with Synthesis Example 4 of WO 2014/050817, (8-octamethylfluoren-12'-yl-(2-(adamantan-1-yl)-8-methyl-3,3b,4,5,6,7,7a,8-octahydrocyclopenta[a]indene)) zirconium dichloride (metallocene compound (1)) was synthesized.

(2) Preparation of Solid Cocatalyst Component (1)

A solid polyaluminoxane composition for use as a solid cocatalyst component was prepared based on a known method (WO 2014/123212). Specifically, a 1 L glass autoclave equipped with a stirrer was charged with 40 mL of toluene, and a 20 mass % toluene solution of polymethylaluminoxane manufactured by Albemarle (Al concentration=2.95 mmol/mL, 166 mL, 490 mmol). The temperature was then increased to 45° C. while performing stirring. Subsequently, a toluene solution (20.5 mL) of n-octanophenone (14.7 g, 71.8 mmol) was added over a period of 80 minutes. After the addition, the mixture was stirred at 45° C. for 30 minutes, heated to 115° C. at a heat-up rate of 0.80° C./min, and reacted at 115° C. for 30 minutes. Thereafter, the mixture was heated to 150° C. at a heat-up rate of 0.58° C./min, and reacted at 150° C. for 150 minutes. After the reaction, the mixture was cooled to room temperature. The slurry thus obtained was filtered through a filter, and the powder on the filter was washed with dehydrated toluene three times. Thereafter, dehydrated toluene was added. Thus, a toluene slurry of a solid polyaluminoxane composition as a solid cocatalyst component (1) was obtained.

The particle size distribution of the solid polyaluminoxane composition obtained was measured. The volume median diameter (D50) was 9.8 μm and the uniformity index was 0.237.

(3) Preparation of Solid Catalyst Component (Metallocene Catalyst) (1)

A 200 mL three-necked flask thoroughly purged with nitrogen and equipped with a stirrer was charged, under a stream of nitrogen, with 17.8 mL of purified hexane and 20.5 mL of the toluene slurry of the solid cocatalyst component (1) synthesized above (2.00 g in terms of solid of the solid polyaluminoxane composition (the solid cocatalyst component)). A suspension was thus prepared. Thereafter, the temperature was increased to 35° C. while performing stirring. Subsequently, 80.0 mg (8.0 mL as a 10 mg/mL toluene solution) of the previously synthesized metallocene compound (1) was added while performing stirring. The reaction was performed for 60 minutes. Thereafter, 3.75 mL of a toluene solution of triisobutylaluminum (1 mol/L in terms of aluminum atoms) was added, and the reaction was carried out for 60 minutes. The temperature was lowered to room temperature and stirring was terminated. The supernatant (17 mL) was removed by decantation. The solid catalyst component (1) thus obtained was washed with hexane (75 mL) three times at room temperature, and then the total volume was adjusted to 50 mL by the addition of hexane.

(4) Preparation of Prepolymerized Catalyst Component (BPP-1)

Under a stream of nitrogen, 2.0 mL of a toluene solution of triisobutylaluminum (1 mol/L in terms of aluminum atoms) was added to the slurry of the solid catalyst component (1) prepared as described above. Thereafter, the mixture was cooled to 20° C. and ethylene (6.3 g) was fed over a period of 6 hours. After the completion of the feeding of ethylene, stirring was terminated. The mixture was washed by decantation with hexane at room temperature (washing efficiency: 98%) and was formed into 50 mL of a hexane slurry. A 10 mL portion of the obtained slurry was filtered through a filter, and the powder on the filter was washed twice with 10 mL of dehydrated hexane. The washed powder was dried under reduced pressure for 2 hours to give a prepolymerized catalyst component (BPP-1) as a powder. The powder was mixed together with mineral oil to give a mineral oil slurry having a concentration of the prepolymerized catalyst component of 9.98 mass %. The zirconium content in the prepolymerized catalyst component (BPP-1) was measured to be 0.087 mass %.

(5) Propylene Polymerization

A 3.4 L internal volume SUS autoclave thoroughly purged with nitrogen was charged with 1.0 mL of a decane solution of triethylaluminum (Al=0.5 M). Next, 600 g of liquid propylene and 6.5 L of hydrogen were fed. The content liquid was adjusted to 55° C. while performing sufficient stirring. A mixture of 172.2 mg of the mineral oil slurry of the prepolymerized catalyst component (BPP-1) and 1.25 mL of the decane solution of triethylaluminum (Al=0.5 M), prepared as described above, was fed to a catalyst pot. The catalyst pot was pressurized, the mineral oil slurry of the prepolymerized catalyst component (BPP-1) and the decane solution of triethylaluminum in the catalyst pot were injected into the autoclave, and polymerization was started. The polymerization was carried out at 60° C. for 40 minutes while performing sufficient stirring. The resultant polymer was dried under reduced pressure at 80° C. for 10 hours. Thus, 151.8 g of a propylene polymer of Production Example β-1 was obtained.

Production Example β-2

A 3.4 L internal volume SUS autoclave thoroughly purged with nitrogen was charged with 1.0 mL of a decane solution of triethylaluminum (Al=0.5 M). Next, 600 g of liquid propylene and 4.0 L of hydrogen were fed. The content liquid was adjusted to 55° C. while performing sufficient stirring. A mixture of 200.1 mg of the mineral oil slurry of the prepolymerized catalyst component (BPP-1) and 1.25 mL of the decane solution of triethylaluminum (Al=0.5 M), prepared as described above, was fed to a catalyst pot. The catalyst pot was pressurized, the mineral oil slurry of the prepolymerized catalyst component (BPP-1) and the decane solution of triethylaluminum in the catalyst pot were injected into the autoclave, and polymerization was started. The polymerization was carried out at 60° C. for 40 minutes while performing sufficient stirring. The resultant polymer was dried under reduced pressure at 80° C. for 10 hours. Thus, 152.6 g of a propylene polymer of Production Example β-2 was obtained.

Production Example γ-1

<Preparation of Solid Titanium Component>

A 2 L internal volume high-speed stirring device (manufactured by Tokushu Kika Kogyo Co., Ltd.) was thoroughly purged with nitrogen, and thereafter the device was charged with 700 ml of purified kerosine, 10 g of magnesium chloride, 24.2 g of ethanol and 3 g of sorbitan distearate ("Emazole 320" manufactured by Kao Atlas Co., Ltd.). The temperature in the system was raised under stirring, and the stirring was performed in conditions of 120° C. and 800 rpm for 30 minutes. Liquid transfer to a 2 L glass flask (equipped with a stirrer) filled with 1 L of purified kerosene cooled to −10° C. in advance was performed under high-speed stirring, by using a Teflon (registered trademark) tube having an inner diameter of 5 mm. The solid obtained was filtered, and sufficiently washed with purified n-hexane, and thus a solid adduct in which 2.8 mol of ethanol was coordinated to 1 mol of magnesium chloride was obtained.

Next, the solid adduct (45 mmol in terms of magnesium atoms) was suspended in 20 ml of decane, and thereafter the total amount thereof was introduced into 195 ml of titanium tetrachloride maintained at −20° C., under stirring. The temperature of the mixed liquid was raised to 80° C. over a period of 5 hours, and 1.8 ml (6.2 mmol) of diisobutyl phthalate was added. The temperature was subsequently raised to 110° C., and stirring was performed for 1.5 hours.

After the completion of the reaction for 1.5 hours, a solid portion was collected by thermal filtration, and washed with decane at 100° C. and hexane at room temperature until no titanium was detected in the filtrate. Thus, a solid titanium component including 3.8 mass % of titanium, 16 mass % of magnesium, 18.2 mass % of diisobutyl phthalate and 1.1 mass % of an ethanol residue was obtained.

<Preparation of Solid Titanium Catalyst Component (a-3)>

A 200 ml glass reactor thoroughly purged with nitrogen was charged with 6.8 g of the solid titanium component obtained, 113 ml of paraxylene, 11 ml of decane, 2.5 ml (23 mmol) of titanium tetrachloride and 0.34 ml (1.2 mmol) of diisobutyl phthalate. The temperature in the reactor was raised to 130° C., a contact treatment was performed under stirring at that temperature for 1 hour, and thereafter a solid portion was collected by thermal filtration. This solid portion was resuspended in 101 ml of paraxylene, and 1.7 ml (15 mmol) of titanium tetrachloride and 0.22 ml (0.8 mmol) of diisobutyl phthalate were further added.

Next, the temperature was raised to 130° C., and the reaction was performed under stirring for 1 hour while the temperature was maintained. After the completion of the reaction, solid-liquid separation was performed again by thermal filtration, and the solid portion obtained was washed with decane at 100° C. and hexane at room temperature until the concentration of paraxylene in the catalyst reached not more than 1 mass %. Thus, a solid titanium catalyst component (α-3) including 1.3 mass % of titanium, 20 mass % of magnesium, 13.8 mass % of diisobutyl phthalate and 0.8 mass % of diethyl phthalate was obtained.

The present inventors assume that the diethyl phthalate detected in the solid titanium catalyst component (a-3) probably resulted from the transesterification of diisobutyl phthalate and ethanol used for the production of the solid titanium component, accompanying the process of production of the solid titanium catalyst component.

[Preparation of Prepolymerized Catalyst (b-3)]

112.0 g of the solid titanium catalyst component (a-3) synthesized above, 83.0 mL of triethylaluminum, 23.6 mL of diethylaminotriethoxysilane and 10 L of heptane were inserted into a 20 L internal volume autoclave equipped with a stirrer. While maintaining the internal temperature at 15 to 20° C., 336 g of propylene was inserted. The reaction was carried out for 120 minutes while performing stirring. After the completion of the polymerization, the solid component was precipitated. The supernatant was removed, and the residue was washed twice with heptane. The prepolymerized catalyst thus obtained was resuspended in purified heptane. The concentration of the solid titanium catalyst component (a-3) was adjusted to 0.7 g/L by the addition of heptane. A prepolymerized catalyst slurry was thus obtained. The prepolymerized catalyst (b-3) slurry contained 3 g of polypropylene per gram of the solid titanium catalyst component (a-3).

[Production of Propylene Block Copolymer]

A 58 L internal volume polymerization vessel equipped with a stirrer was filled by continuous supply of 45 kg/h of propylene, 450 NL/h of hydrogen, 0.60 g/h of the prepolymerized catalyst (b-3) slurry in terms of solid of the titanium catalyst component (a-3), 3.3 mL/h of triethylaluminum and 2.5 mL/h of diethylaminotriethoxysilane, and polymerization was performed in the absence of a gas phase. The temperature of the tubular polymerizer was 70° C., and the pressure was 3.5 MPaG.

The slurry thus obtained was fed to a 70 L internal volume polymerization vessel equipped with a stirrer for further polymerization. 43 kg/h of propylene and hydrogen at a rate to keep the hydrogen concentration in the gas phase at 8.9 mol % were continuously supplied to the polymerizer. The polymerization was carried out at a polymerization temperature of 66.5° C. and a pressure of 3.2 MPaG.

The slurry thus obtained was added to a 2.4 L internal volume liquid transfer tube and was gasified to perform gas-solid separation. The polypropylene homopolymer powder was transferred to a 480 L internal volume gas phase polymerizer, and ethylene/propylene block copolymerization was performed. Propylene, ethylene and hydrogen were continuously supplied so that the gas composition in the gas phase polymerizer would be ethylene/(ethylene+propylene)=0.239 (molar ratio) and hydrogen/ethylene=0.0043 (molar ratio). The polymerization was carried out at a polymerization temperature of 70° C. and a pressure of 0.7 MPaG.

The slurry thus obtained was deactivated and was gasified for gas-solid separation. Vacuum drying was performed at 80° C. Thus, a propylene/ethylene block copolymer (propylene block copolymer) having a polypropylene moiety and an ethylene/propylene copolymer moiety was obtained. Characteristics of the block copolymer obtained, of Production Example γ-1, were as follows.

MFR (a load of 2.16 kg, 230° C.)=85 g/10 min
Proportion of 23° C. n-decane-soluble fraction=11 mass %
Ethylene content in 23° C. n-decane-soluble fraction=40 mol %

[Production Example γ-2]

A 58 L internal volume polymerization vessel equipped with a stirrer was filled by continuous supply of 45 kg/h of propylene, 450 NL/h of hydrogen, 0.60 g/h of the prepolymerized catalyst (b-3) slurry in terms of solid of the titanium catalyst component (a-3), 3.3 mL/h of triethylaluminum and 2.5 mL/h of diethylaminotriethoxysilane, and polymerization was performed in the absence of a gas phase. The temperature of the tubular polymerizer was 70° C., and the pressure was 3.5 MPaG.

The slurry thus obtained was fed to a 70 L internal volume polymerization vessel equipped with a stirrer for further polymerization. 43 kg/h of propylene and hydrogen at a rate to keep the hydrogen concentration in the gas phase at 8.9 mol % were continuously supplied to the polymerizer. The polymerization was carried out at a polymerization temperature of 66.5° C. and a pressure of 3.2 MPaG. The slurry thus obtained was deactivated, and propylene was evaporated. A powdery propylene polymer was thus obtained. The propylene polymer obtained, of Production Example γ-2, had an MFR of 230 g/10 min.

Production Example α-3

<Preparation of Solid Titanium Catalyst Component (a-3)>

"Preparation of solid titanium component" and "Preparation of solid titanium catalyst component (a-3)" in Production Example γ-1 were performed. A solid titanium catalyst component (a-3) including 1.3 wt % of titanium, 20 wt % of magnesium, 13.8 wt % of diisobutyl phthalate and 0.8 wt % of diethyl phthalate was obtained.

[Preparation of Prepolymerized Catalyst (b-4)]

100.0 g of the solid titanium catalyst component (a-3) synthesized above, 68.4 mL of triethylaluminum, 18.4 mL of ethyldiethylaminodimethoxysilane and 10 L of heptane were inserted into a 20 L internal volume autoclave equipped with a stirrer. While maintaining the internal temperature at 15 to 20° C., 600 g of propylene was inserted. The reaction was carried out for 120 minutes while performing stirring. After the completion of the polymerization, the solid component was precipitated. The supernatant was removed, and the residue was washed three times with heptane. The prepolymerized catalyst obtained was resuspended in purified heptane. The concentration of the solid catalyst component was adjusted to 1.0 g/L by the addition of heptane. The prepolymerized catalyst contained 6 g of polypropylene per gram.

[Production of Propylene Polymer]

A 1000 L internal volume first polymerization vessel equipped with a stirrer was charged with 300 L of propylene. While maintaining this liquid level, 69 kg/h of propylene, 2.2 g/h of the prepolymerized catalyst (b-4) in terms of solid of the titanium catalyst component (a-3), 10.2 mL/h of triethylaluminum and 7.2 mL/h of ethyldiethylaminodimethoxysilane were continuously supplied. The polymerization was carried out at a polymerization temperature of 74° C. and a pressure of 3.07 MPa/G under hydrogen blocking.

The slurry thus obtained was fed to a 500 L internal volume second polymerization vessel equipped with a stirrer for further polymerization. The second polymerizer was charged with 300 L of propylene. While maintaining this liquid level, 57 kg/h of propylene and hydrogen at a rate to keep the hydrogen concentration in the gas phase at 8.6 mol % were supplied. The polymerization was carried out at a polymerization temperature of 65.5° C. and a pressure of 2.94 MPa/G.

The slurry thus obtained was fed to a 500 L internal volume third polymerization vessel equipped with a stirrer for further polymerization. The third polymerizer was charged with 250 L of propylene. While maintaining this liquid level, 11 kg/h of propylene and hydrogen at a rate to keep the hydrogen concentration in the gas phase at 4.3 mol % were supplied. The polymerization was carried out at a polymerization temperature of 62° C. and a pressure of 2.76 MPa/G.

The slurry thus obtained was added to a 1.9 L internal volume liquid transfer tube and was gasified to perform gas-solid separation, and a polypropylene polymer was thus obtained. The propylene polymer obtained was vacuum dried at 80° C. The propylene polymer obtained had an MFR of 1.8 g/10 min. The slurry in the first polymerizer was extracted by a 1.6 L internal volume liquid transfer tube, and was gasified to perform gas-solid separation. The intrinsic viscosity of the polypropylene powder obtained was measured, and was 11.5 dl/g.

The proportion of the polypropylene polymer produced in the first polymerizer, in the polypropylene polymer finally obtained, was determined from the amount of reaction heat generated in the polymerization removed, and was 22 mass %.

Production Example γ-3

[Production of Propylene Polymer]

A 500 L internal volume first polymerization vessel equipped with a stirrer was charged with 300 L of propylene. While maintaining this liquid level, 100 kg/h of propylene, 2.2 g/h, in terms of solid of the titanium catalyst component (a-3), of the prepolymerized catalyst (b-4), 18.9 mL/h of triethylaluminum, 6.8 mL/h of ethyldiethylaminodimethoxysilane and hydrogen at a rate to keep the concentration at the gas phase at 6.0 mol % were continuously supplied. The polymerization was carried out at a polymerization temperature of 64° C. and a pressure of 2.82 MPa/G.

The slurry thus obtained was added to a 1.9 L internal volume liquid transfer tube and was gasified to perform gas-solid separation, and a polypropylene polymer was thus obtained. The propylene polymer obtained was vacuum dried at 80° C. The propylene polymer obtained had an MFR of 34 g/10 min.

Production Example γ-4

[Production of Propylene Polymer]

A 500 L internal volume first polymerization vessel equipped with a stirrer was charged with 300 L of propylene. While maintaining this liquid level, 100 kg/h of propylene, 2.3 g/h, in terms of solid of the titanium catalyst component (a-3), of the prepolymerized catalyst (b-4), 18.9 mL/h of triethylaluminum, 6.8 mL/h of ethyldiethylaminodimethoxysilane and hydrogen at a rate to keep the concentration in the gas phase at 14.2 mol % were continuously supplied. The polymerization was carried out at a polymerization temperature of 64° C. and a pressure of 3.21 MPa/G.

The slurry thus obtained was added to a 1.9 L internal volume liquid transfer tube and was gasified to perform gas-solid separation, and a polypropylene polymer was thus obtained. The propylene polymer obtained was vacuum dried at 80° C. The propylene polymer obtained had an MFR of 241 g/10 min.

Production Example γ-5

[Preparation of Solid Titanium Catalyst Component (a-3)]

"Preparation of solid titanium catalyst component (a-3)" in Production Example α-3 was performed. A solid titanium catalyst component (a-3) including 1.3 wt % of titanium, 20 wt % of magnesium, 13.8 wt % of diisobutyl phthalate and 0.8 wt % of diethyl phthalate was obtained.

[Preparation of Prepolymerized Catalyst (b-5)]

100.0 g of the solid titanium catalyst component (a-3), 68.4 mL of triethylaluminum, 19.4 mL of diethylaminotriethoxysilane and 10 L of heptane were inserted into a 20 L internal volume autoclave equipped with a stirrer. While maintaining the internal temperature at 15 to 20° C., 1000 g of propylene was inserted. The reaction of propylene was carried out for 120 minutes while performing stirring. After the completion of the polymerization, the solid component was precipitated. The supernatant was removed, and the residue was washed three times with heptane. The prepolymerized catalyst obtained was resuspended in purified heptane. The concentration of the solid catalyst component was adjusted to 1.0 g/L by the addition of heptane. The prepolymerized catalyst contained 10 g of polypropylene per gram.

[Production of Propylene Polymer]

A 500 L internal volume first polymerization vessel equipped with a stirrer was charged with 300 L of propylene. While maintaining this liquid level, 103.0 kg/h of propylene, 1.0 g/h, in terms of solid of the titanium catalyst component (a-3), of the prepolymerized catalyst (b-5), 4.2 mL/h of triethylaluminum, 3.8 mL/h of diethylaminotriethoxysilane and hydrogen at a rate to keep the concentration in the gas phase at 14.0 mol % were continuously supplied. The polymerization was carried out at a polymerization temperature of 68° C. and a pressure of 3.56 MPa/G.

The slurry thus obtained was added to a 1.9 L internal volume liquid transfer tube and was gasified to perform gas-solid separation, and a polypropylene polymer was thus obtained. The propylene polymer obtained was vacuum dried at 80° C. The propylene polymer obtained had an MFR of 500 g/10 min.

Properties of the polymers obtained in Production Examples above are summarized in Table 1.

TABLE 1

|  |  |  | Prod. Ex. α-1 | Prod. Ex. α-2 | Prod. Ex. α-3 |
|---|---|---|---|---|---|
| Total | MFR | g/10 min | 1.2 | 3.6 | 1.8 |
| Component A | Amount | mass % | 25 | 20 | 22 |
|  | [η] | dl/g | 11 | 8 | 11.5 |
| Component C | Amount | mass % | 75 | 80 | 78 |
|  | [η] | dl/g | 0.99 | 1.44 | 0.82 |

|  |  |  | Prod. Ex. β-1 | Prod. Ex. β-2 |
|---|---|---|---|---|
| Component B | MFR | g/10 min | — | 1860 |
|  | [η] | dl/g | 0.31 | 0.50 |
|  | Mn |  | 1.3.E+04 | 2.6.E+04 |
|  | Mw/Mn |  | 2.6 | 2.2 |
|  | TREF-20° C. elution | mass % | 0.6 | 0.0 |

|  |  |  | Prod. Ex. γ-1 | Prod. Ex. γ-2 | Prod. Ex. γ-3 | Prod. Ex. γ-4 | Prod. Ex. γ-5 |
|---|---|---|---|---|---|---|---|
| Total | MFR | g/10 min | 85 | 230 | 34 | 241 | 500 |
| Component C | Amount | mass % | 89 | 100 | 100 | 100 | 100 |
|  | [η] | dl/g | 0.83 | 0.86 | 1.25 | 0.85 | 0.74 |

TABLE 1-continued

| Component D | Amount | mass % | 11 | 0 | 0 | 0 | 0 |
|---|---|---|---|---|---|---|---|
| | Ethylene content | mol % | 40 | — | — | — | — |

Example 1

16.5 Parts of the propylene polymer of Production Example α-1, 17.5 parts of the propylene polymer of Production Example β-1, 14 parts of the propylene polymer of Production Example γ-1, 22 parts of an elastomer (ethylene/butene copolymer rubber, "TAFMER A-1050S", manufactured by MITSUI CHEMICALS, INC.), 30 parts of talc ("HAR 3G77L", manufactured by IMERYS Minerals Japan K.K.), 0.1 part of heat stabilizer "IRGANOX 1010" (BSF), 0.1 part of heat stabilizer "IRGAFOS 168" (BSF), 0.1 part of calcium stearate and 0.1 part of antioxidant "H-BHT" (Honshu Chemical Industry Co., Ltd.) were mixed together with a tumbler. Next, the mixture was melt-kneaded with a twin-screw kneading extruder under the following conditions to give pellets of a propylene polymer composition.
(Melt-Kneading Conditions)
Co-rotating twin-screw kneading extruder: "KZW-15" manufactured by TECHNOVEL CORPORATION
Kneading temperature: 190° C.
Screw rotational speed: 500 rpm
Feeder rotational speed: 50 rpm

Examples 2 to 7 and Comparative Examples 1 to 11

Pellets of propylene polymer compositions were obtained in the same manner as in Example 1, except that the formulations except the heat stabilizers, antioxidants and calcium stearate were changed as described in Tables 2 to 6.

The propylene polymer compositions obtained in Examples and Comparative Examples above were formed with an injection molding machine under the following conditions to give test pieces having shapes described later.
(JIS small test pieces, small square plates/injection molding conditions)
Injection molding machine: "EC40" manufactured by Toshiba Machine Co., Ltd.
Cylinder temperature: 190° C.
Mold temperature: 40° C.
Injection time-dwell time: 13 seconds (primary filling time: 1 second)
Cooling time: 15 seconds <Charpy Impact Value at Room Temperature>
The Charpy impact value ($kJ/m^2$) at room temperature was measured in accordance with JIS K7111 at a temperature of 23° C. with respect to a 10 mm (width)×80 mm (length)×4 mm (thickness) test piece notched by machining.
<Flexural Modulus (FM)>
The flexural modulus FM (MPa) was measured in accordance with JIS K7171 under the following conditions.
Test piece: 10 mm (width)×80 mm (length)×4 mm (thickness)
Bending speed: 2 ram/min
Bending span: 64 mm
(Hot Deformation Temperature (HDT))
The hot deformation temperature was measured in accordance with JIS K7191-1. Specifically, both ends of a test piece were supported in a heating bath, and a predetermined bending stress (a constant load of 0.45 MPa) was applied to the center of the test piece by means of a loading rod. The temperature of a heating medium was increased at a rate of 2° C./min. The temperature of the heating medium at the time when the deflection of the test piece reached a predetermined amount was adopted as the hot deformation temperature.
<Rockwell Hardness>
The Rockwell hardness (R scale) was measured by stacking two test pieces described below, in accordance with JIS K7202.
Test piece: 30 mm (width)×30 mm (length)×2 mm (thickness)
<Gloss>
The specular gloss(60°) was measured in accordance with JIS 28741.
<Coefficient of Linear Expansion (Average)>
The coefficient of linear expansion ($10^{-5}/°$ C.) was evaluated by a TMA method (measurement range: −30 to 80° C.) in accordance with JIS 27197. Test pieces having an approximate size of 10 mm×5 mm×2 mm thickness were cut out from the vicinity of the center of a small square plate (30 mm (width)×30 mm (length)×2 mm (thickness)) in the MD direction and in the TD direction. The test pieces that had been cut out were annealed at 120° C. for 2 hours, and the coefficient of linear expansion was measured with respect to each of the test piece cut out in the MD direction and the test piece cut out in the TD direction. The results of the two test pieces were averaged.

TABLE 2

| | | | Ex. 1 | Ex. 2 | Ex. 3 | Comp. Ex. 1 | Comp. Ex. 2 | Comp. Ex. 3 |
|---|---|---|---|---|---|---|---|---|
| Formulation | Propylene polymer of Production Example α-1 | parts by mass | 16.5 | 10.5 | | | | 16.5 |
| | Propylene polymer of Production Example α-2 | parts by mass | | | 12 | | | |
| | Propylene polymer of Production Example β-1 | parts by mass | 17.5 | | | | 17.5 | |
| | Propylene polymer of Production Example β-2 | parts by mass | | 23.5 | 22 | | | |
| | Propylene polymer of Production Example γ-1 | parts by mass | 14 | 14 | 14 | 14 | 14 | 14 |
| | Propylene polymer of Production Example γ-2 | parts by mass | | | | 34 | 16.5 | 17.5 |
| | Elastomer | parts by mass | 22 | 22 | 22 | 22 | 22 | 22 |
| | Talc | parts by mass | 30 | 30 | 30 | 30 | 30 | 30 |
| | Total | parts by mass | 100 | 100 | 100 | 100 | 100 | 100 |
| Amounts of components | Propylene homopolymer (A) having 7 ≤ [η] ≤ 12 dl/g | mass % | 8.9 | 5.6 | 5.2 | 0.0 | 0.0 | 8.9 |
| | Propylene polymer (B) having 0.21 ≤ [η] < 0.54 dl/g | mass % | 37.6 | 50.5 | 47.3 | 0.0 | 37.7 | 0.0 |
| | Propylene polymer (C) having 0.54 ≤ [η] < 2.6 dl/g | mass % | 53.5 | 43.8 | 47.5 | 100.0 | 62.3 | 91.1 |
| | Total of (A) to (C) | mass % | 100.0 | 100.0 | 100.0 | 100.0 | 100.0 | 100.0 |

TABLE 2-continued

|  |  |  | Ex. 1 | Ex. 2 | Ex. 3 | Comp. Ex. 1 | Comp. Ex. 2 | Comp. Ex. 3 |
|---|---|---|---|---|---|---|---|---|
| Properties | MFR | g/10 min | 30 | 41 | 34 | 31 | 79 | 13 |
|  | Charpy impact value at room temperature | kJ/m$^2$ | 5.0 | 6.5 | 11.2 | 16.4 | 3.4 | 14.1 |
|  | FM | MPa | 3400 | 3320 | 3210 | 2890 | 3100 | 2860 |
|  | HDT | °C. | 120 | 124 | 132 | 124 | 129 | 118 |
|  | Rockwell hardness | R | 66 | 64 | 62 | 54 | 64 | 57 |
|  | Gloss | % | 43 | 40 | 40 | 31 | 26 | 43 |
|  | Coefficient of linear expansion (ave.) | 10$^{-5}$/°C. | 3.8 | 4.0 | 4.1 | 4.1 | 3.9 | 4.2 |

TABLE 3

|  |  |  | Ex. 4 | Comp. Ex. 4 | Comp. Ex. 5 | Comp. Ex. 6 | Comp. Ex. 7 | Comp. Ex. 8 |
|---|---|---|---|---|---|---|---|---|
| Formulation | Propylene polymer of Production Example α-3 | parts by mass | 79 | 84 |  |  |  |  |
|  | Propylene polymer of Production Example β-1 | parts by mass | 5 |  | 5 | 5 |  |  |
|  | Propylene polymer of Production Example γ-3 | parts by mass |  |  | 79 |  | 84 |  |
|  | Propylene polymer of Production Example γ-4 | parts by mass |  |  |  | 79 |  | 84 |
|  | Talc | parts by mass | 16 | 16 | 16 | 16 | 16 | 16 |
|  | Total | parts by mass | 100 | 100 | 100 | 100 | 100 | 100 |
| Amounts of components | Propylene homopolymer (A) having 7 ≤ [η] ≤ 12 dl/g | mass % | 20.6 | 22.0 | 0.0 | 0.0 | 0.0 | 0.0 |
|  | Propylene polymer (B) having 0.21 ≤ [η] < 0.54 dl/g | mass % | 6.0 | 0.0 | 6.0 | 6.0 | 0.0 | 0.0 |
|  | Propylene polymer (C) having 0.54 ≤ [η] < 2.6 dl/g | mass % | 73.4 | 78.0 | 94.0 | 94.0 | 100.0 | 100.0 |
|  | Total of (A) to (C) | mass % | 100.0 | 100.0 | 100.0 | 100.0 | 100.0 | 100.0 |
| Properties | MFR | g/10 min | 5 | 4 | 47 | 263 | 37 | 215 |
|  | FM | MPa | 4310 | 4100 | 3730 | 3880 | 3570 | 3760 |

TABLE 4

|  |  |  | Ex. 5 | Comp. Ex. 9 |
|---|---|---|---|---|
| Formulation | Propylene polymer of Production Example α-3 | parts by mass | 37.1 | 39.5 |
|  | Propylene polymer of Production Example β-1 | parts by mass | 5 |  |
|  | Propylene polymer of Production Example γ-3 | parts by mass | 41.9 | 44.5 |
|  | Talc | parts by mass | 16 | 16 |
|  | Total | parts by mass | 100 | 100 |
| Amounts of components | Propylene homopolymer (A) having 7 ≤ [η] ≤ 12 dl/g | mass % | 9.7 | 10.3 |
|  | Propylene polymer (B) having 0.21 ≤ [η] < 0.54 dl/g | mass % | 6.0 | 0.0 |
|  | Propylene polymer (C) having 0.54 ≤ [η] < 2.6 dl/g | mass % | 84.3 | 89.7 |
|  | Total of (A) to (C) | mass % | 100.0 | 100.0 |
| Properties | MFR | g/10 min | 20 | 15 |
|  | FM | MPa | 4150 | 3970 |

TABLE 5

|  |  |  | Ex. 6 | Comp. Ex. 10 |
|---|---|---|---|---|
| Formulation | Propylene polymer of Production Example α-3 | parts by mass | 37.1 | 39.5 |
|  | Propylene polymer of Production Example β-1 | parts by mass | 5 |  |
|  | Propylene polymer of Production Example γ-4 | parts by mass | 41.9 | 44.5 |
|  | Talc | parts by mass | 16 | 16 |
|  | Total | parts by mass | 100 | 100 |
| Amounts of components | Propylene homopolymer (A) having 7 ≤ [η] ≤ 12 dl/g | mass % | 9.7 | 10.3 |
|  | Propylene polymer (B) having 0.21 ≤ [η] < 0.54 dl/g | mass % | 6.0 | 0.0 |
|  | Propylene polymer (C) having 0.54 ≤ [η] < 2.6 dl/g | mass % | 84.3 | 89.7 |
|  | Total of (A) to (C) | mass % | 100.0 | 100.0 |

TABLE 5-continued

|  |  |  | Ex. 6 | Comp. Ex. 10 |
|---|---|---|---|---|
| Properties | MFR | g/10 min | 43 | 33 |
|  | FM | MPa | 4390 | 4260 |

TABLE 6

|  |  |  | Ex. 7 | Comp. Ex. 11 |
|---|---|---|---|---|
| Formulation | Propylene polymer of Production Example α-3 | parts by mass | 37.1 | 39.5 |
|  | Propylene polymer of Production Example β-1 | parts by mass | 5 |  |
|  | Propylene polymer of Production Example γ-5 | parts by mass | 41.9 | 44.5 |
|  | Talc | parts by mass | 16 | 16 |
|  | Total | parts by mass | 100 | 100 |
| Amounts of components | Propylene homopolymer (A) having 7 ≤ [η] ≤ 12 dl/g | mass % | 9.7 | 10.3 |
|  | Propylene polymer (B) having 0.21 ≤ [η] < 0.54 dl/g | mass % | 6.0 | 0.0 |
|  | Propylene polymer (C) having 0.54 ≤ [η] < 2.6 dl/g | mass % | 84.3 | 89.7 |
|  | Total of (A) to (C) | mass % | 100.0 | 100.0 |
| Properties | MFR | g/10 min | 59 | 48 |
|  | FM | MPa | 4520 | 4270 |

The invention claimed is:

1. A propylene polymer composition comprising:
a propylene homopolymer (A) having an intrinsic viscosity [η] measured in a tetralin solvent at 135° C. in the range of 7 to 12 dl/g;
a propylene polymer (B) having an intrinsic viscosity [η] measured in a tetralin solvent at 135° C. in the range of not less than 0.21 dl/g and less than 0.54 dl/g, and having a proportion of a component eluted at a temperature of not more than −20° C. in temperature rising elution fractionation (TREF) in the range of not more than 3.5 mass %; and
a propylene polymer (C) having an intrinsic viscosity [η] measured in a tetralin solvent at 135° C. in the range of not less than 0.54 dl/g and less than 2.6 dl/g; wherein
the content of the propylene homopolymer (A) is 0.5 to 47.5 mass %, the content of the propylene polymer (B) is 5 to 95 mass % and the content of the propylene polymer (C) is 2.5 to 85.5 mass %, based on the total of the propylene homopolymer (A), the propylene polymer (B) and the propylene polymer (C),
wherein the propylene polymer (C) is selected from the group consisting of homopolymers of propylene, and copolymers of propylene and a C2-C20 α-olefin (except propylene), and
wherein in the copolymer, the content of propylene-derived structural units is more than 90 mol % and less than 100 mol %, and the content of C2-C20 α-olefin (except propylene)-derived structural units is more than 0 mol % and less than 10 mol % to the total of the number of propylene-derived structural units and the number of C2-C20 α-olefin-derived structural units.

2. The propylene polymer composition according to claim 1, further comprising an ethylene random copolymer (D) and/or an inorganic filler (E), wherein
the content of the ethylene random copolymer (D) is 0 to 40 mass % and the content of the inorganic filler (E) is 0 to 50 mass %, based on the total of the propylene homopolymer (A), the propylene polymer (B), the propylene polymer (C), the ethylene random copolymer (D) and the inorganic filler (E), provided that the content of at least one of the ethylene random copolymer (D) and the inorganic filler (E) is more than 0 mass %.

3. The propylene polymer composition according to claim 1, wherein the propylene polymer (B) has a meso pentad fraction (mmmm) determined by $^{13}$C-NMR of 90.0 to 100%.

4. The propylene polymer composition according to claim 1, wherein the propylene polymer (B) has a melting point (Tm) measured with a differential scanning calorimeter (DSC) of not less than 140° C.

5. The propylene polymer composition according to claim 1, wherein the propylene polymer (B) has a total proportion of irregular bonds stemming from 2,1-insertion and 1,3-insertion in all propylene units determined by $^{13}$C-NMR in the range of not more than 0.3 mol %.

6. The propylene polymer composition according to claim 1, wherein the content of propylene-derived structural units in the propylene polymer (B) is not less than 98 mol %.

7. A shaped article comprising the propylene polymer composition described in claim 1.

* * * * *